United States Patent [19]

Tashiro et al.

[11] Patent Number: 5,748,773
[45] Date of Patent: May 5, 1998

[54] IMAGE PROCESSING APPARATUS

[75] Inventors: Hirohiko Tashiro; Yoshiyuki Suzuki, both of Yokohama; Hiroyuki Ichikawa; Satoru Kutsuwada, both of Kawasaki; Akio Itoh, Machida; Yoshinori Abe, Tama, all of Japan

[73] Assignee: Canon Kabushiki Kaisha, Tokyo, Japan

[21] Appl. No.: 343,885

[22] Filed: Nov. 17, 1994

Related U.S. Application Data

[63] Continuation of Ser. No. 18,391, Feb. 17, 1993, abandoned.

[30] Foreign Application Priority Data

Feb. 21, 1992 [JP] Japan .................. 4-035023
May 19, 1992 [JP] Japan .................. 4-126400

[51] Int. Cl.$^6$ .................................. G06K 9/00
[52] U.S. Cl. .................. 382/169; 382/170; 382/274; 358/461
[58] Field of Search ........................ 382/168, 169, 382/170, 171, 172, 176, 254, 274, 167; 358/519, 521, 522, 548, 561, 562

[56] References Cited

U.S. PATENT DOCUMENTS

| | | | |
|---|---|---|---|
| 4,641,267 | 2/1987 | Asai et al. | 364/414 |
| 4,792,979 | 12/1988 | Nomura et al. | 382/54 |
| 4,903,145 | 2/1990 | Funada | 358/462 |
| 4,929,979 | 5/1990 | Kimoto et al. | 355/38 |
| 4,991,092 | 2/1991 | Greensite | 382/54 |
| 5,046,118 | 9/1991 | Ajewole et al. | 382/51 |
| 5,121,224 | 6/1992 | Ng et al. | 382/51 |
| 5,123,060 | 6/1992 | Cho et al. | 382/50 |
| 5,140,649 | 8/1992 | Kageyama | 382/51 |
| 5,144,566 | 9/1992 | Anderson et al. | 382/51 |
| 5,164,993 | 11/1992 | Capozzi et al. | 382/51 |
| 5,170,443 | 12/1992 | Todd | 382/50 |
| 5,179,599 | 1/1993 | Formanek | 382/51 |
| 5,212,741 | 5/1993 | Barski et al. | 382/169 |
| 5,258,783 | 11/1993 | Sasanuma et al. | 346/157 |

FOREIGN PATENT DOCUMENTS

| | | | |
|---|---|---|---|
| 435658 | 7/1991 | European Pat. Off. | H04N 1/46 |
| 0082288 | 3/1989 | Japan . | |

*Primary Examiner*—Leo Boudreau
*Assistant Examiner*—Phuoc Tran
*Attorney, Agent, or Firm*—Fitzpatrick, Cella, Harper & Scinto

[57] ABSTRACT

An image processing apparatus having a first mode for processing electrical signals by a pre-scan operation and a second mode for processing electrical signals by a main scan operation. The first mode forms a histogram on the basis of electrical signals obtained by the pre-scan operation, and detects predetermined feature points from the formed histogram. A table is formed for converting signal levels of the electrical signals according to the detected predetermined feature points of the histogram based on the image type of the original. The second mode generates reproduction signals from electrical signals obtained by the main scan operation in accordance with the table.

18 Claims, 26 Drawing Sheets

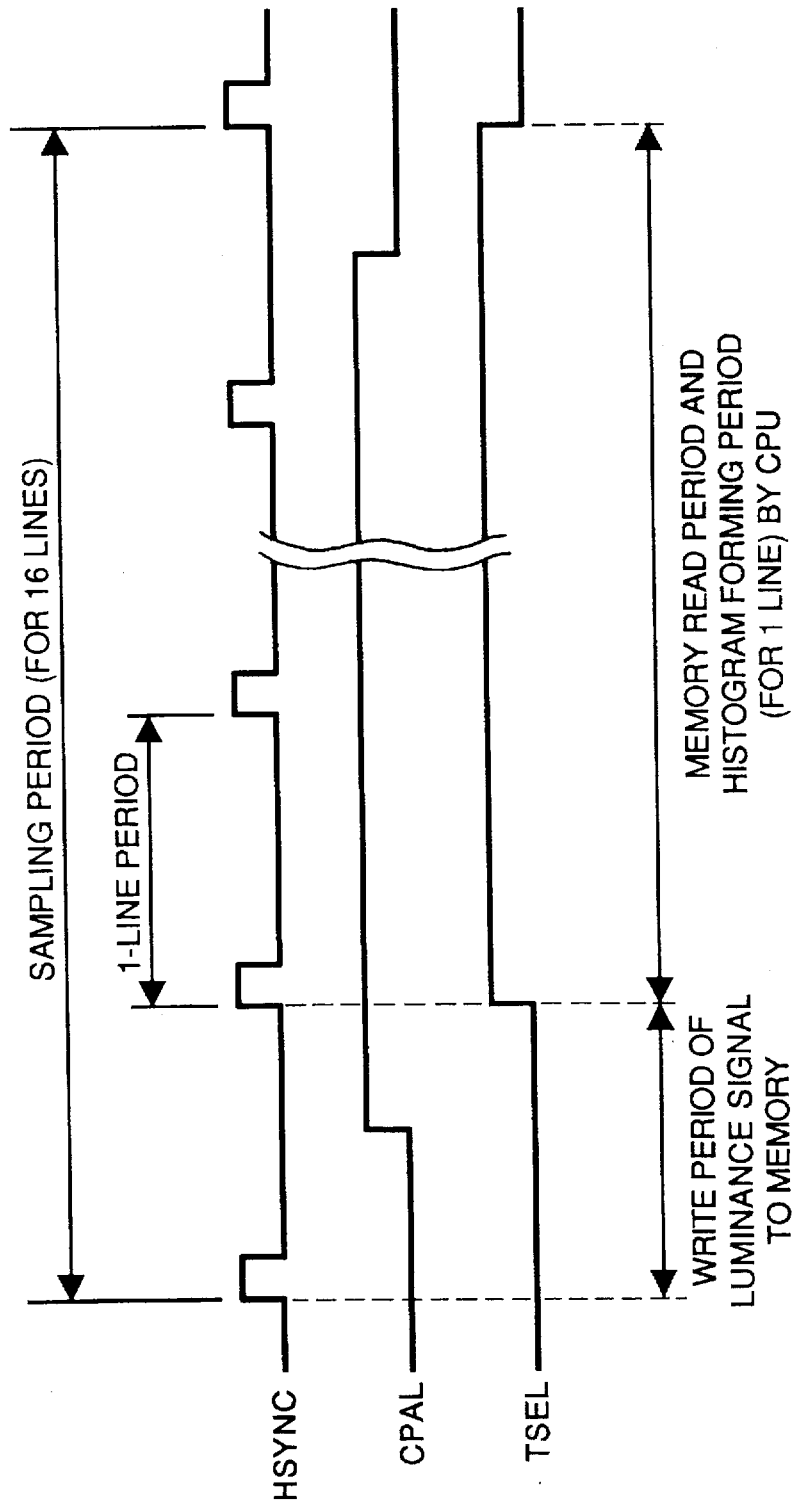

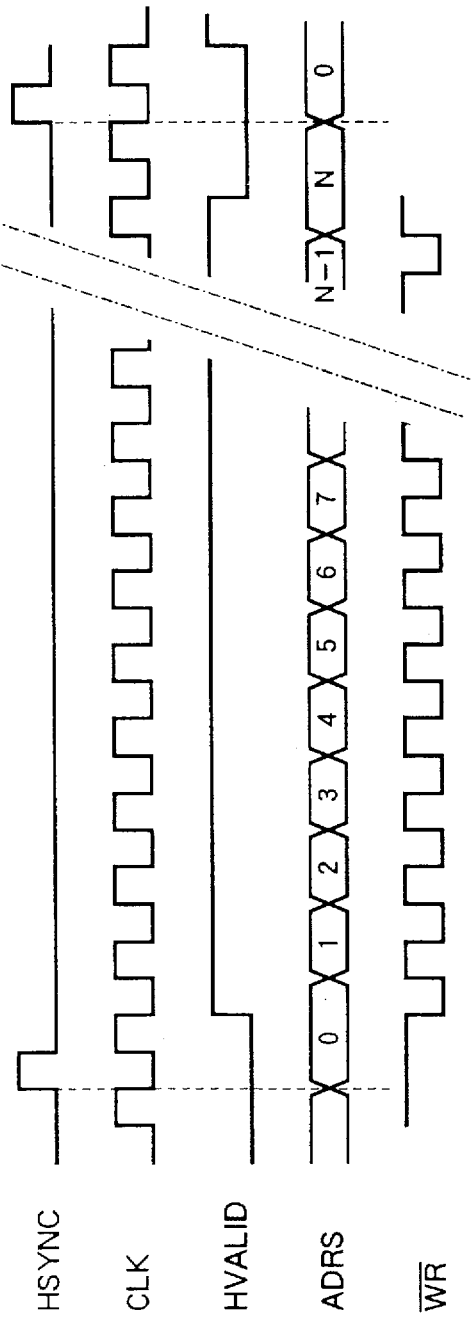
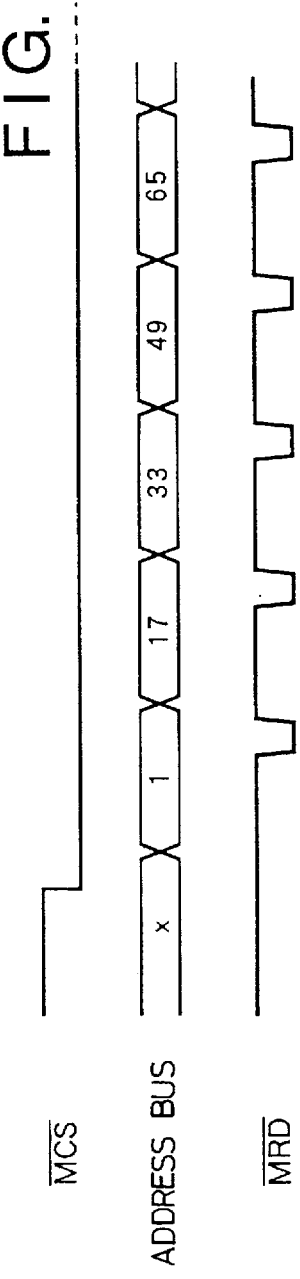
FIG. 6A
FIG. 6B

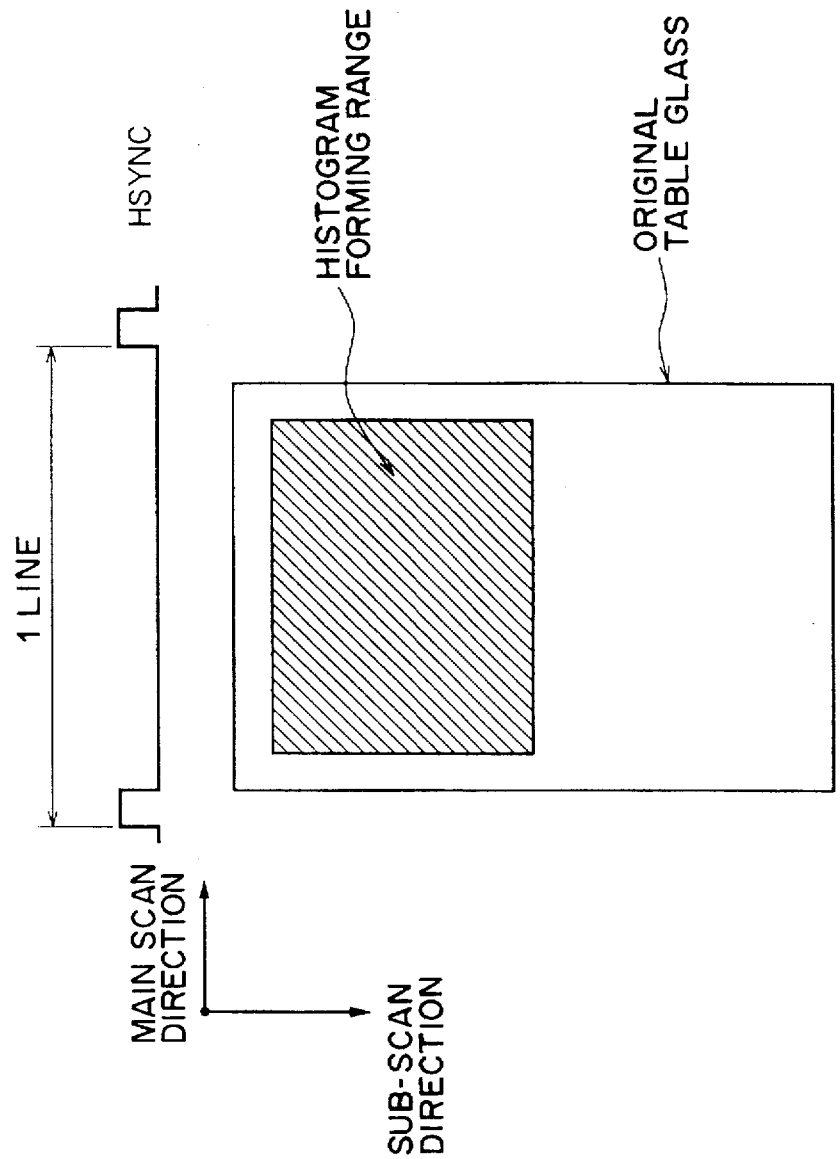

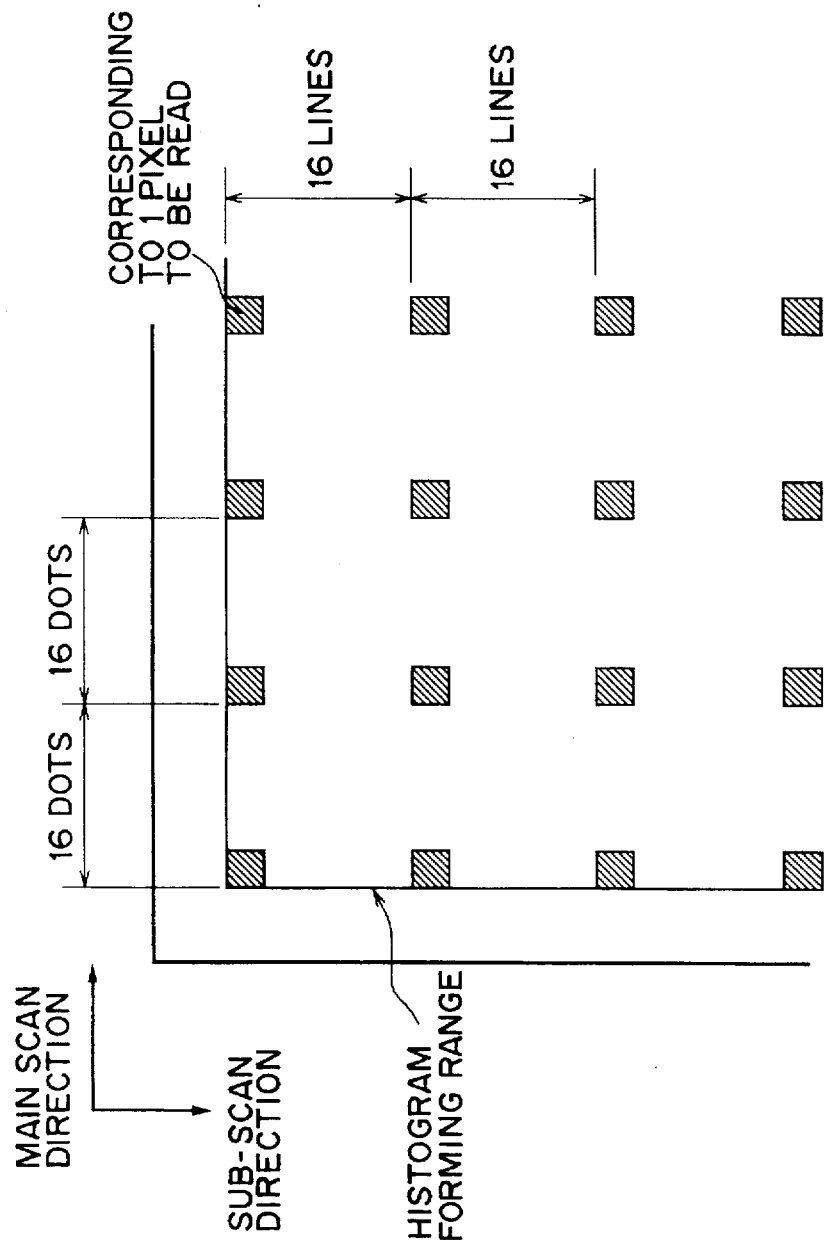

NORMAL IMAGE TYPE

REVERSAL IMAGE TYPE

FIG. 19
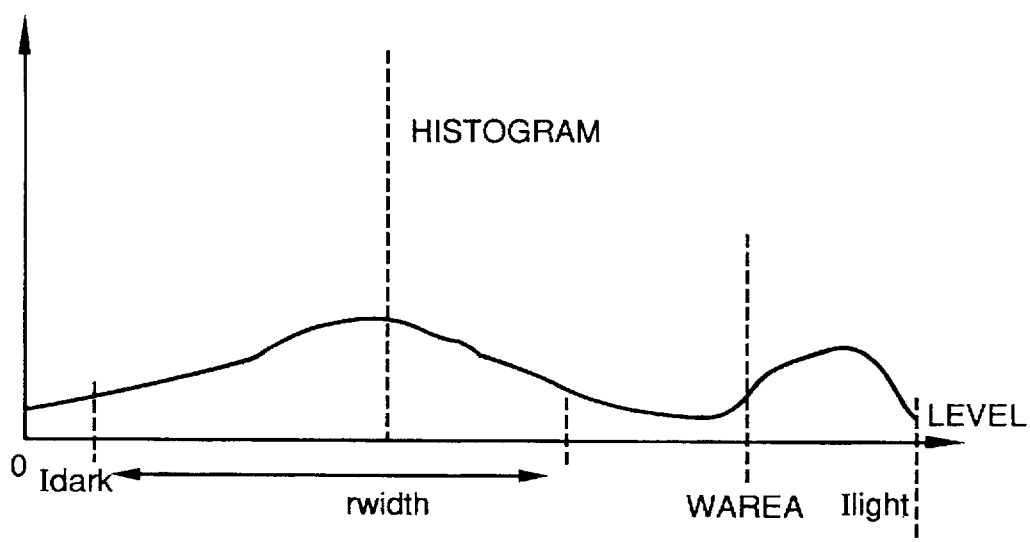
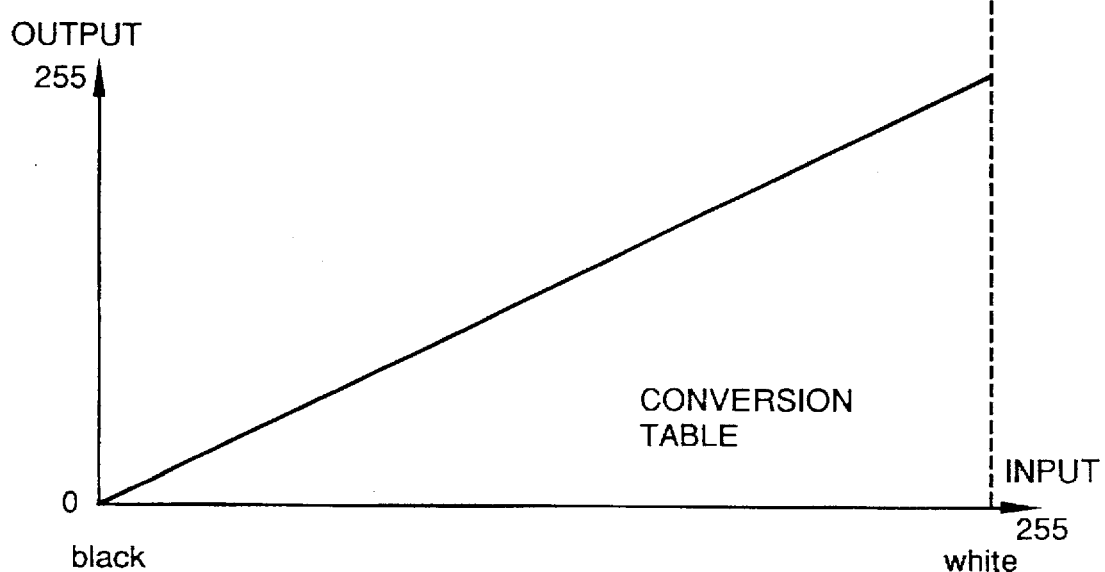

[NORMAL IMAGE TYPE]
[REVERSAL IMAGE TYPE]

IMAGE PROCESSING APPARATUS

This application is a continuation of application Ser. No. 08/018,391, filed Feb. 17, 1993, now abandoned.

BACKGROUND OF THE INVENTION

1. Field of the Invention

The present invention relates to an image processing apparatus and, more particularly, to an image processing apparatus, which can adopt an automatic density conversion method for original information for faithfully reproducing an original image (to be referred to as "AE processing" hereinafter).

2. Description of the Related Art

In a conventional image processing apparatus, an original image is read by an image input device, and the read image data is converted to an electrical signal. The electrical signal is subjected to image processing, and thereafter, the processed signal is output as an image by an output device such as a laser beam printer.

Such an image processing apparatus has a function of selecting an original mode and a density based on operation of selection buttons on an operation unit according to the type or density of an original, as its characteristic feature.

However, designation (selection) from the operation unit makes it very difficult to obtain a copy having a desired recording density and image quality although a density and the like can be desirably selected.

For this reason, selection of buttons on the operation unit and recording must be repeated several times. Therefore, wasteful copying operations are undesirably performed, and the time required until a desired copy is obtained is prolonged.

When the density of a character portion on a light character original is increased, a background image is undesirably fogged, resulting in a poor appearance.

SUMMARY OF THE INVENTION

It is an object of the present invention to provide an image processing apparatus, which can eliminate the conventional drawbacks.

It is another object of the present invention to provide an image processing apparatus, which can automatically discriminate the density or type of an original without manually selecting a density or original type, and can facilitate a copying operation.

It is still another object of the present invention to provide an image processing apparatus, which can facilitate a copying operation, and can shorten copying time.

It is still another object of the present invention to provide an image processing apparatus, which does not record an unnecessary portion of an original, and can record an original image including a light information portion while emphasizing the information portion to be darker.

It is still another object of the present invention to provide an image processing apparatus, which can record an original image having gradation characteristics without impairing those characteristics.

It is still another object of the present invention to provide an image processing apparatus, which can obtain a copy suffering from less blurring of characters or deterioration of image quality by executing optical gradation correction of even a copied original obtained after repetitive copying operations.

It is still another object of the present invention to provide an image processing apparatus, which can simplify a copying operation, and can obtain an optical copy output according to the density or type of an original even by simplified copying operation.

It is still another object of the present invention to provide an image processing apparatus which comprises first forming means for forming a histogram on the basis of input electrical signals, detection means for detecting predetermined feature points from the formed histogram, and second forming means for forming a table for converting signal levels of the electrical signals according to the detected predetermined feature points in units of types of original.

It is still another object of the present invention to provide an image processing apparatus, which has a first mode of processing electrical signals by a pre-scan operation and a second mode of processing electrical signals by a main scan operation, comprising first forming means for forming a histogram on the basis of electrical signals obtained by the pre-scan operation, detection means for detecting predetermined feature points from the formed histogram, second forming means for forming a table for converting signal levels of the electrical signals according to the detected predetermined feature points in units based on the of original, and generation means for generating reproduction signals on the basis of electrical signals obtained by the main scan operation in accordance with the table formed by the second forming means.

It is still another object of the present invention to provide an image processing apparatus, which has a first mode for processing electrical signals by a pre-scan operation and a second mode for processing electrical signals by a main scan operation, comprising first forming means for forming a histogram on the basis of electrical signals obtained by the pre-scan operation, detection means for detecting predetermined feature points from the formed histogram, discrimination means for discriminating a type of original according to the detected predetermined feature points, second forming means for forming a first table for converting luminance signals of the electrical signals according to the discriminated type of original, third forming means for forming a second table for performing luminance-density conversion of the electrical signal according to the formed first table, and generation means for generating reproduction signals from the electrical signals obtained by the main scan operation according to the formed first and second tables.

It is still another object of the present invention to provide an image processing method comprising steps of forming a histogram on the basis of input electrical signals, detecting predetermined feature points from the formed histogram, and forming a table for converting signal levels of the electrical signals according to the detected predetermined feature points in units based on the of original.

It is still another object of the present invention to provide an image processing method, which has a first mode for processing electrical signals by a pre-scan operation and a second mode for processing electrical signals by a main scan operation, comprising steps of forming a histogram on the basis of electrical signals obtained by the pre-scan operation, detecting predetermined feature points from the formed histogram, forming a table for converting signal levels of the electrical signals according to the detected predetermined feature points in units based on the of original, and generating reproduction signals on the basis of electrical signals obtained by the main scan operation in accordance with the table formed by the table forming step.

It is still another object of the present invention to provide an image processing method, which has a first mode for processing electrical signals by a pre-scan operation and a second mode for processing electrical signals by a main scan operation, comprising steps of forming a histogram on the basis of electrical signals obtained by the pre-scan operation, detecting predetermined feature points from the formed histogram, discriminating a type of original according to the detected predetermined feature points, forming a first table for converting luminance signals of the electrical signals according to the discriminated type of original, forming a second table for performing luminance-density conversion of the electrical signals according to the formed first table, and generating reproduction signals from the electrical signals obtained by the main scan operation according to the formed first and second tables.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a timing chart showing an operation state upon formation of a histogram;

FIGS. 6A and 6B are timing charts showing read and write timings of an internal memory of the histogram forming unit;

FIG. 7A is a view showing a histogram formation range upon formation of a histogram, and FIG. 7B is a view for explaining a sampling interval;

FIG. 19 is a graph showing a gradation image type original in the second embodiment;

DESCRIPTION OF THE PREFERRED EMBODIMENTS

<First Embodiment>

Figure 1:
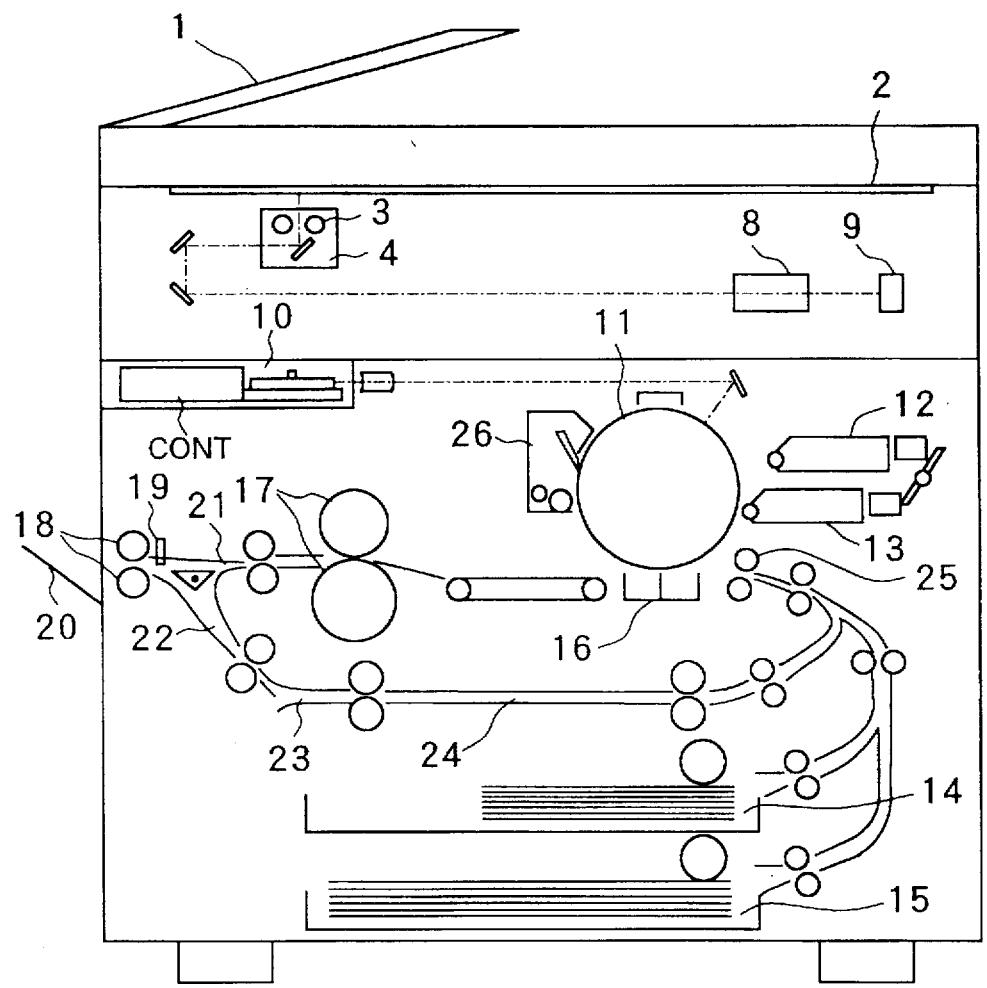
FIG. 1 is a sectional view showing a structure of an image processing apparatus according to a first embodiment of the present invention.

FIG. 1 is a side sectional view showing an arrangement of an image copying apparatus according to the first embodiment of the present invention.

In FIG. 1, reference numeral 1 denotes an original feeder as an original feeding mechanism for feeding stacked originals one by one or feeding two consecutive originals to a predetermined position on an original table glass surface 2. Reference numeral 3 denotes a scanner comprising, e.g., a lamp, a scanning mirror 5, and the like. When an original is placed on the original table glass surface 2 by the original feeder 1, the main body of the scanner 3 is reciprocally scanned in predetermined directions, and light reflected by the original is color-separated by RGB color separation filters (not shown) through scanning mirrors 5 to 7 and a lens 8, thus forming color-separated images on an image sensor section 9.

Reference numeral 10 denotes an exposure control section comprising a laser scanner. The exposure control section 10 radiates a light beam modulated on the basis of image data output from an image signal control unit 23 (see FIG. 2; to be described later) of a controller section CONT onto a photosensitive body 11. Reference numerals 12 and 13 denote developing devices each for visualizing an electrostatic latent image formed on the photosensitive body 11 using a developing agent (toner) of a predetermined color. Reference numerals 14 and 15 denote transfer sheet stacking sections each for stacking and storing recording media having a standard size. Each recording medium is fed to a registration position by driving a paper feed roller, and is re-fed in synchronism with an image leading end timing of an image to be formed on the photosensitive body 11.

Reference numeral 16 denotes a transfer/separation charger for transferring a toner image developed on the photosensitive body 11 onto a transfer sheet, and separating the transfer sheet from the photosensitive body 11. The separated sheet is conveyed to a fixing section 17 via a conveyor belt, and the transferred image on the sheet is fixed by the fixing section 17. Reference numeral 18 denotes discharge rollers for discharging and stacking transfer sheets, for which image formation has been completed, onto a tray 20. Reference numeral 19 denotes a discharge sensor. Reference numeral 21 denotes a direction flapper, for switching the convey direction of the transfer sheet, for which image formation has been completed, between a discharge port direction and an internal convey path direction so as to prepare for a multiple/double-sided image formation process.

Image formation onto a recording medium will be described below. An image signal input to the image reader section 9, i.e., an input signal from a reader 22 (to be described later) is processed by an image signal control circuit 23, which is controlled by a CPU 25, and the processed signal is supplied to a printer 24. The signal input to the printer 24 is converted into a light signal by the exposure control section 10, and the light signal is radiated onto the photosensitive body 11 according to an image signal. A latent image formed on the photosensitive body 11 by the radiated light is developed by the developing device 12 or 13. A transfer sheet is conveyed from the transfer sheet stacking unit 14 or 15 in synchronism with the latent image timing, and the developed image is transferred onto the sheet by the transfer/separation charger 16. The transferred image is fixed on the transfer sheet by the fixing section 17, and the transfer sheet is then discharged outside the apparatus by the discharge rollers 18.

In a double-sided recording mode, after the transfer sheet passes the discharge sensor 19, the discharge rollers 18 are rotated in a direction opposite to the paper discharge direction. At the same time, the direction flapper 21 is moved upward to store the copied transfer sheet in an intermediate tray 24 via convey paths 22 and 23. In a rear-surface recording operation to be executed next, the transfer sheet stored in the intermediate tray 24 is fed, and an image is transferred onto the rear surface of the sheet.

In a multiple recording mode, the direction flapper 21 is moved upward to store the copied transfer sheet in the intermediate tray 24 via the convey paths 22 and 23. In the multiple recording operation to be executed next, the transfer sheet stored in the intermediate tray 24 is fed, and is subjected to a multiple transfer process.

Figure 2:
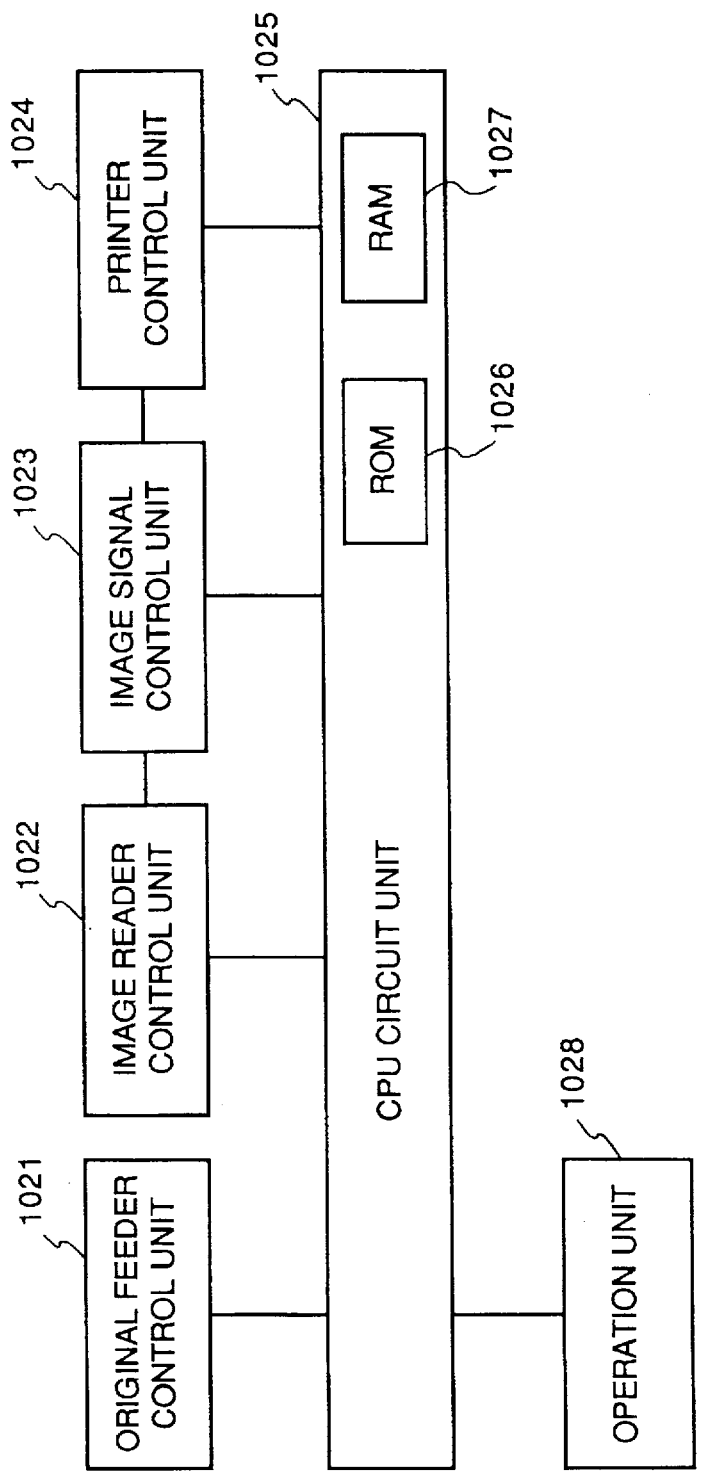
FIG. 2 is a block diagram showing an arrangement of the controller section CONT shown in FIG. 1.

FIG. 2 is a block diagram showing an internal arrangement of the controller section CONT shown in FIG. 1. Referring to FIG. 2, reference numeral 1025 denotes a CPU circuit unit, which incorporates a ROM 1026 and a RAM 1027, and systematically controls the respective units on the basis of a control program stored in the ROM 1026.

Reference numeral 1021 denotes an original (automatic) feeder control unit, which controls, e.g., to feed stacked originals one by one or to feed two consecutive originals to the predetermined position on the original table glass surface 2.

Reference numeral 1022 denotes an image reader control unit which comprises, e.g., the image sensor section 9, and outputs analog image signals obtained by photoelectrically converting light signals separated by RGB color separation filters (not shown) to an image signal control unit 1023. Reference numeral 1024 denotes a printer control unit for driving the exposure control section 10 on the basis of a video signal output from the image signal control unit 1023 to radiate a light beam onto the photosensitive body 11. Reference numeral 1028 denotes an operation unit, which has an operation panel having keys for setting modes necessary for image formation, displays, and the like.

Figure 3:
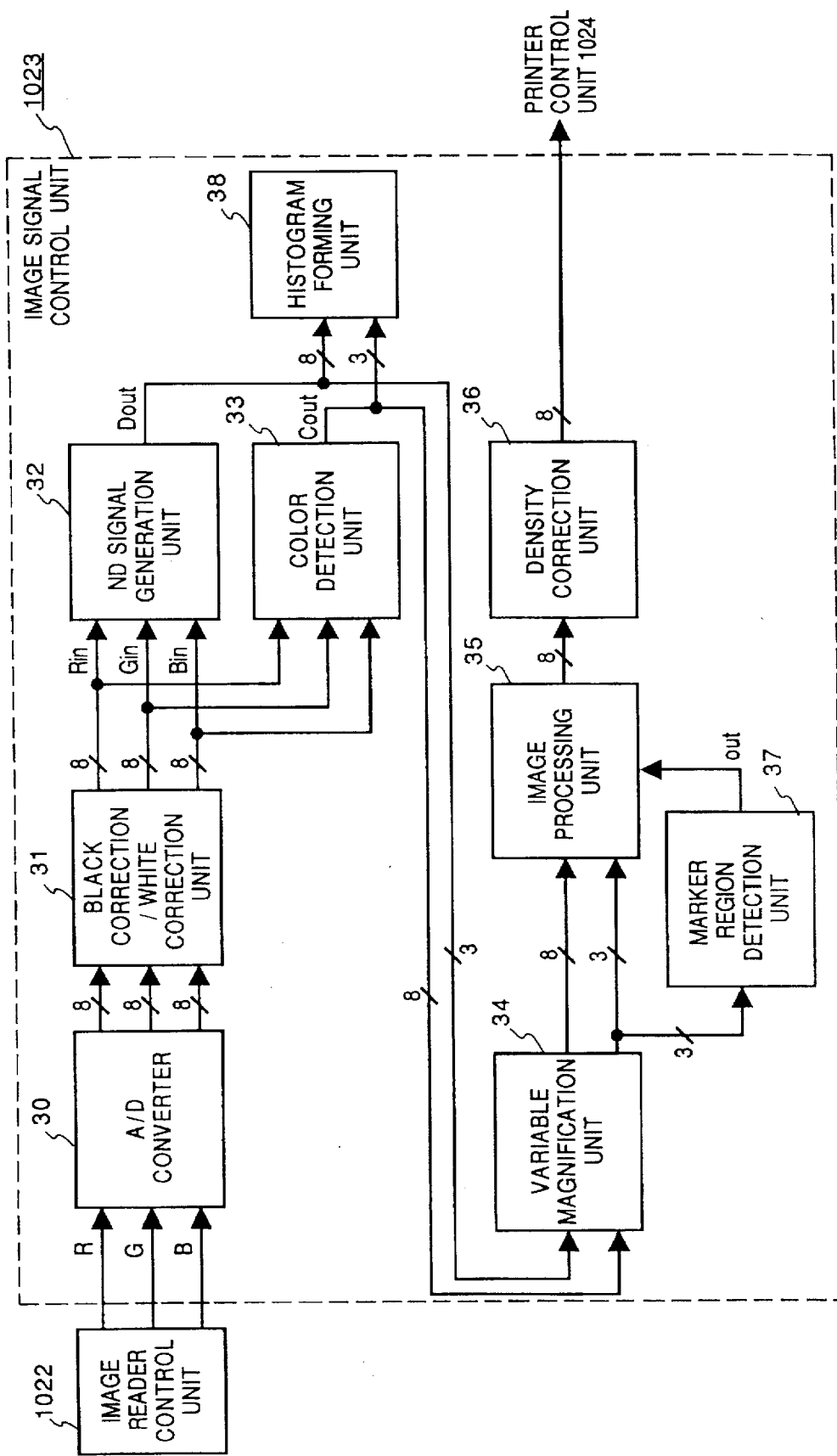
FIG. 3 is a block diagram showing an arrangement of the image signal control unit 1023 shown in FIG. 2.

FIG. 3 is a block diagram showing an internal arrangement of the image signal control unit 1023 of this embodiment. In FIG. 3, reference numeral 30 denotes an A/D converter; 31, a black correction/white correction unit; 32, an ND signal generation unit; 33, a color detection unit; 34, a variable magnification unit; 35, an image processing unit; 36, a density correction unit; 37, a marker region detection unit; and 38, a histogram forming unit.

An operation of the arrangement described above will be described below.

Analog image signals converted to R, G, and B electrical signals by the image reader control unit 1022 are converted into digital signals (8-bit signals in this embodiment) by the A/D converter 30.

The digital signals are subjected to black level correction and white level correction (shading correction) by the black correction/white correction unit 31. Thereafter, the R, G, and B signals are input to the ND signal generation unit 32 and the color detection unit 33.

The ND signal generation unit 32 adds the R, G, and B signals, and divides the sum by 3 to output a luminance signal Dout given by the following equation (1):

$$Dout = (Rin + Gin + Bin)/3 \qquad (1)$$

The color detection unit 33 classifies the input R, G, and B signals to one of, e.g., red, green, blue, pink, yellow, orange (these last three colors are line marker colors), white, and black on the basis of the ratio of the R, G, and B signals, and outputs a 3-bit chrominance signal Cout.

The luminance signal Dout and the chrominance signal Cout are subjected to variable magnification processing in the main scan direction (the line direction of a CCD) or image move processing by the variable magnification unit 34, and the processed signals are input to the image processing unit 35.

The image processing unit 35 executes halftone dot screen processing, pattern conversion processing for converting chrominance information into a monochrome pattern, masking processing, trimming processing, black/white reversal processing, and the like.

Thereafter, the density correction unit 36 executes luminance-density conversion and density correction for a printer, and the processed signals are supplied to the printer control unit 1024 for the printer.

The luminance signal Dout and the chrominance signal Cout respectively output from the ND signal generation unit 32 and the color detection unit 33 are input to the histogram forming unit 38, and a histogram is formed. This histogram is added with chrominance signal information, as needed.

The chrominance signal Cout is also input to the marker region detection unit 37. The marker region detection unit 37 detects a signal of a region designated on an original using a line marker on the basis of the chrominance signal Cout, and supplies it as a processing region signal to the image processing unit 35. The image processing unit 35 executes black/white reversal processing, halftone dot screen processing, and the like inside or outside the designated region according to the processing region signal.

Figure 4:
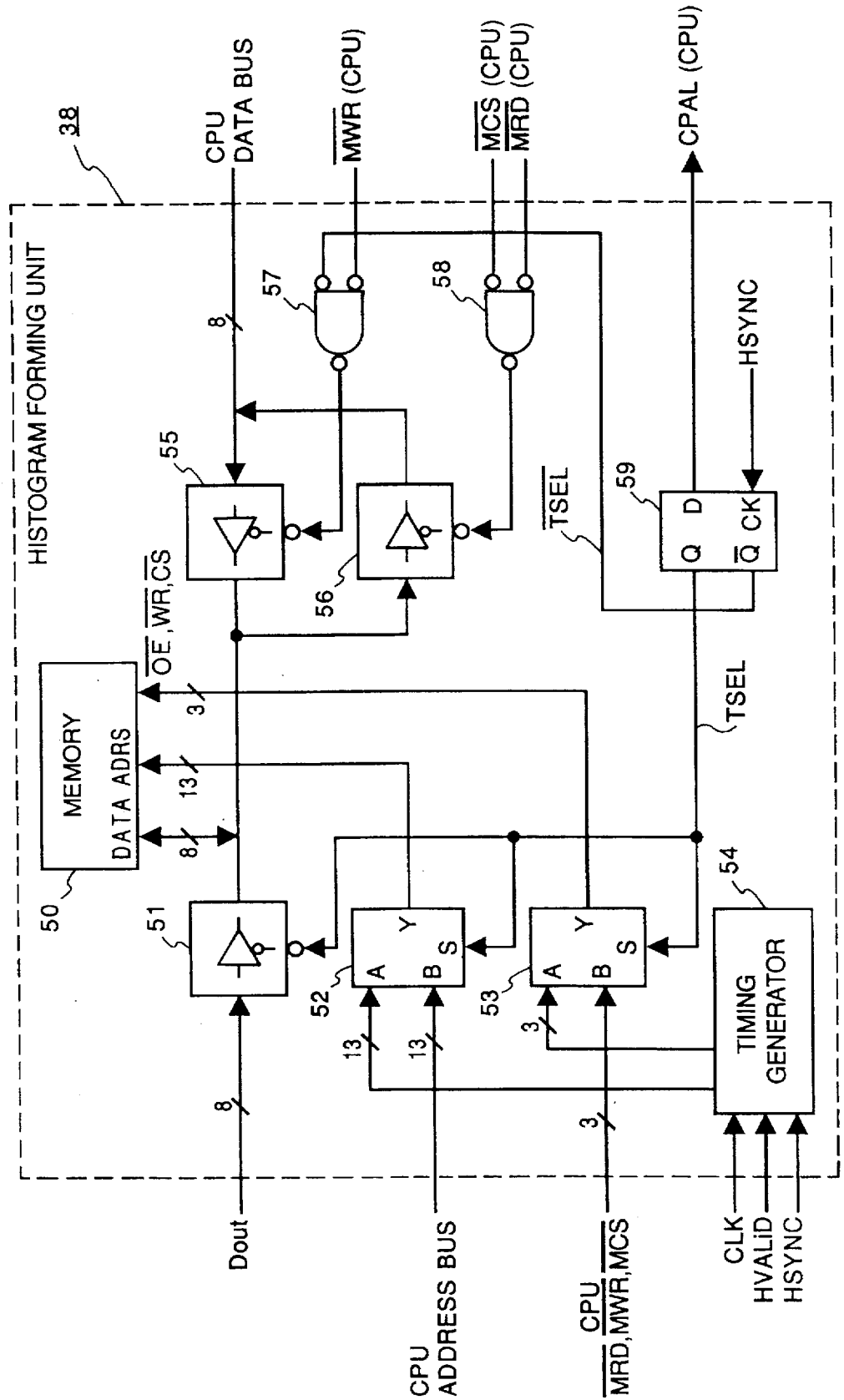
FIG. 4 is a block diagram showing an arrangement of the histogram forming unit 38 of FIG. 3.

FIG. 4 is a block diagram showing an arrangement of the histogram forming unit 38 according to this embodiment.

The arrangement shown in FIG. 4 is entirely controlled by an internal timing generator on the basis of sync signals HSYNC, HVALiD, and CLK. This arrangement can also be controlled by signals from the CPU circuit unit 1025.

FIG. 5 is a timing chart of the histogram forming unit 38 based on the sync signal HSYNC. In FIG. 5, a control signal CPAL from the CPU circuit unit 1025 is synchronized with the signal HSYNC to generate a TSEL signal.

During an L-level period of the TSEL signal, the luminance signal Dout from the ND signal generation unit 32 is written in a memory (to be described later).

During an H-level period of the TSEL signal, the CPU circuit unit 1025 reads out the content of the memory, and a histogram for one line is formed in an internal RAM of a CPU.

Referring to FIG. 4, reference numeral 50 denotes a programmable memory such as a RAM, which has a capacity capable of storing image information for one line read by the image reader section 1022. Reference numeral 51 denotes an output-controllable buffer, which supplies the luminance signal Dout from the ND signal generation unit 32 to the data input terminal of the memory 50 when the TSEL signal is at L level. Reference numerals 52 and 53 denote data selectors each for selecting control signals (address, $\overline{OE}$, $\overline{WR}$, and $\overline{CS}$) generated by a timing generator 54, and control signals (address bus, $\overline{MRD}$, $\overline{MWR}$, and $\overline{MCS}$) from the CPU according to the TSEL signal, and supplying the selected signal to the memory 50.

The timing generator 54 generates control signals on the basis of the sync signals CLK, HVALiD, and HSYNC.

Reference numeral 55 denotes an output-controllable buffer, which is output-controlled by a $\overline{TSEL}$ signal and an $\overline{MWR}$ signal input to a negative logic input NAND gate 57. When the output from the NAND gate 57 is at L level, the buffer 55 sends data from a CPU bus to the data input terminal of the memory 50. Reference numeral 56 denotes an output-controllable buffer, which is output-controlled by an $\overline{MCS}$ signal and an $\overline{MRD}$ signal input to a negative logic input NAND gate 58. When the output from the NAND gate 58 is at L level, the buffer 56 sends data read out from the memory 50 onto the CPU data bus.

Reference numeral 59 denotes a D-type flip-flop, which synchronizes the control signal CPAL from the CPU circuit unit 1025 with the one-line sync signal HSYNC to generate the TSEL signal.

FIGS. 6A and 6B are timing charts showing read and write timings of the internal memory 50 of the histogram forming unit 38 in this embodiment.

FIG. 6A shows the memory write timing during a write period of the luminance signal to the memory in FIG. 5, and this timing is defined by the timing generator 54.

In response to the signal HSYNC, an internal address counter (not shown) of the timing generator 54 is initialized and an ADRS signal is reset to "0". The address counter is an up counter, which counts the sync signal CLK for one pixel of image information and generates the ADRS signal when the HVALiD signal is at H level. According to this ADRS signal, the luminance 1 0 signal is written at a predetermined address ADRS when a memory write signal $\overline{WR}$ goes from L level to H level.

FIG. 6B shows the memory read timing from the CPU circuit unit 1025 during a memory read & histogram forming period in the CPU circuit unit 1025 in FIG. 5. When a memory selection signal $\overline{MCS}$ from the CPU circuit unit 1025 is at L level, a read access to the memory is enabled. An address signal output from the CPU circuit unit 1025 onto an address bus is supplied to the address input terminal of the memory 50. When a CPU memory read signal $\overline{MRS}$ is at L level, the memory content is read out from the memory, and is output onto the CPU data bus. The timing signals (FIGS. 6A and 6B) to be supplied to the memory 50 are selected according to the TSEL signal.

In this embodiment, image processing is executed using a first mode for obtaining a table on the basis of electrical signals of an original image obtained by a pre-scan operation, and a second mode for obtaining reproduction signals of the original image by a main scan operation according to the table obtained in the first mode.

First Mode

Figure 8:
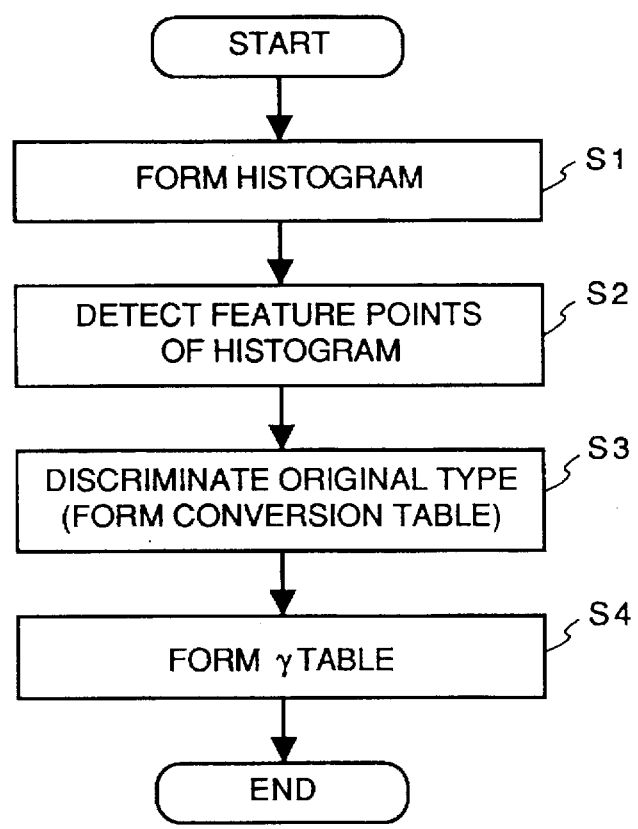
FIG. 8 is a flow chart showing an operation sequence of AE processing in the first embodiment of the present invention.

FIG. 8 is a flow chart of AE processing in this embodiment.

In steps S1 and S2, a histogram is formed, and feature points of the histogram are detected. As will be described later, in step S3, an original type is discriminated, and a conversion table corresponding to the discriminated type is formed. Finally, in step S4, a γ table including the formed conversion table is formed, and is written in the density correction unit 36 of the image signal control unit 1023. The details of processing in steps S1 to S4 will be described below.

[Method of Forming Histogram (S1)]

Formation of a histogram is performed in the following order.

Prior to reading of an original image, a pre-scan operation is performed to input a luminance signal and to form a histogram. In this case, all pixels may be input to sample luminance signals. However, pixels are coarsely thinned out and sampled so as not to disturb the feature of a histogram of an original image. In this case, the sampling interval is, e.g., about 1 mm.

(1) Input of Luminance Signals For One Line

All pixel data for one line are written in the memory 50 during the L-level period of the TSEL signal in FIG. 5. When the TSEL signal is at L level, the buffer 51 is set in an output enable state, and luminance signals Dout from the ND signal generation unit 32 are supplied to the memory 50. In the data selectors 52 and 53, their select terminals S are set at L level, A input terminals are selected, and the control signals (address, $\overline{OE}$, $\overline{WR}$, and $\overline{CS}$) generated by the timing generator 54 are supplied to the memory 50. The write timing is as shown in FIG. 6A.

(2) Memory Read Access by CPU Circuit Unit 1025

The memory content written in (1) is read out by the CPU during the H-level period of the TSEL signal in FIG. 5.

The TSEL signal is generated based on the CPAL signal output from the CPU circuit unit 1025, and the CPU circuit unit 1025 reads out data for one immediately preceding line from the memory when the TSEL signal goes to H level.

When the TSEL signal is at H level, the buffer 51 is set in an output disable state, and its output has a high impedance. In the data selectors 52 and 53, their select terminals S are set at H level, B input terminals are selected, and the control signals (address bus, $\overline{MRD}$, $\overline{MWR}$, and $\overline{MCS}$) from the CPU circuit unit 1025 are supplied to the memory 50. The buffer 56 is set in an output enable state when $\overline{MCS}$ and $\overline{MRD}$ signals from the CPU circuit unit 1025 simultaneously go to L level, and outputs the data read out from the memory onto the data bus of the CPU circuit unit 1025. The buffer 55 is set in an output enable state when $\overline{TSEL}$ and $\overline{MWR}$ signals simultaneously go to L level, and supplies data from the CPU circuit unit 1025 to the memory 50.

If the normal reading resolution is 400 dots/inch, since 1 mm is defined by about 16 dots, data can be read out by the CPU circuit unit 1025 at every sixteenth (main scan direction). For example, the addresses are changed like 1, 17, 33, 49, and 65. The read timing is as shown in FIG. 6B.

(3) Formation of Histogram

A histogram is formed by adding the frequencies of levels of the luminance signals read out from the memory in units of levels. Sampling data for one line are processed, and the processing result is stored in the internal memory of the CPU circuit unit 1025.

In this embodiment, since the luminance signal is an 8-bit signal, the frequencies in a range from 0 to 255 levels are added. If one level is expressed by 16 bits, the maximum frequency corresponding to about 65,000 pieces of data can be stored. More specifically, in order to store histogram data, a memory capacity of 256 words (512 bytes) is required.

(4) Operation for Repeating Processing Operations (1) and (2) within a Predetermined Range Since the sampling interval in the sub-scan direction is also 1 mm, if the reading resolution is 400 dots/inch, luminance signals need only be written in the memory every 16 lines.

Since this time is determined by controlling the CPAL signal from the CPU circuit unit 1025, the CPAL signal is set at H level at every time intervals corresponding to 16 lines, and after formation of histogram data for one line, the CPAL signal is set at L level.

FIG. 7A shows a histogram forming range of this embodiment, and FIG. 7B shows a sampling interval of this embodiment.

The relationship between sampling operations and a histogram forming range for an original will be explained below with reference to FIGS. 7A and 7B.

In FIG. 7A, when the sampling interval is 1 mm, and the memory for storing histogram data is a 16-bit memory, since the maximum frequency corresponding to about 65,000 pieces of data can be stored, an A4-size (210 mm×297 mm) histogram forming range is obtained.

In FIG. 7B, data are sampled at every 16 dots in the main scan direction, and at every 16 lines in the sub-scan direction. Since the pre-scan speed is equal to a normal reading speed (equal magnification), sampled data corresponds to one pixel to be normally read.

[Detection of Feature Points of Histogram (S2)]

Figure 9:
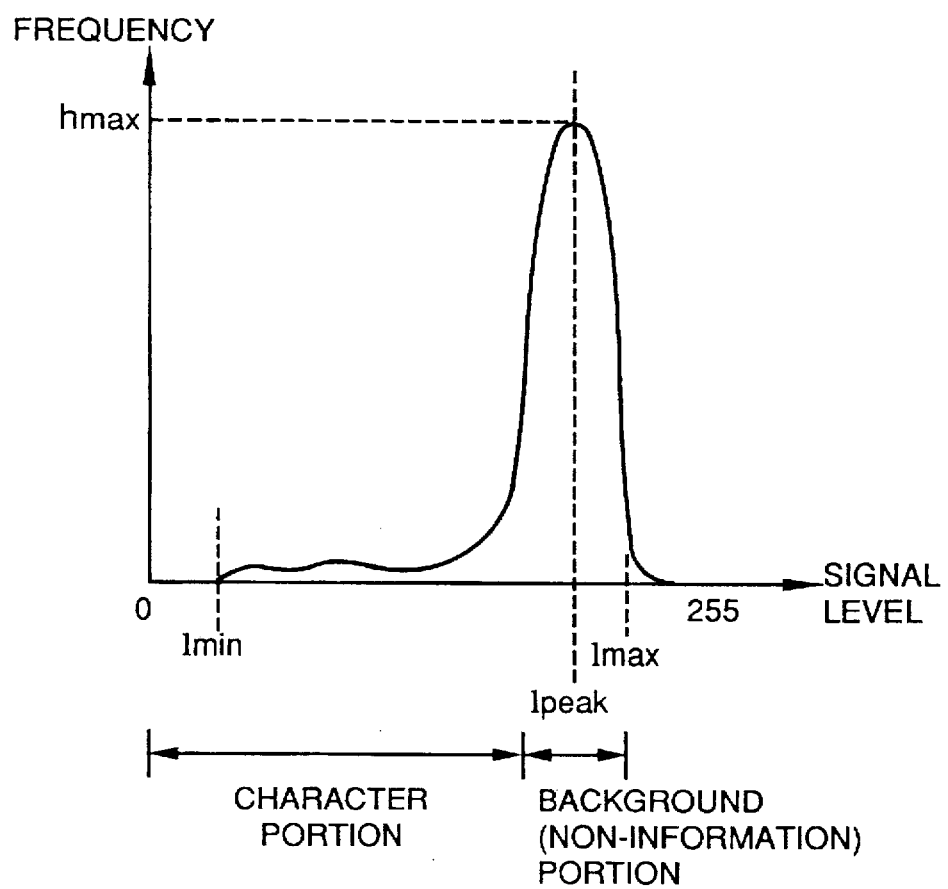
FIG. 9 is a view showing a histogram of a typical original.

Upon repetition of the above-mentioned processing, a histogram is formed, as shown in FIG. 9.

FIG. 9 shows a histogram of a typical original. This histogram is the most popular one for a normal original. That is, an original includes a background portion (to be also referred to as a non-information portion hereinafter) having almost the same density over a wide range, and characters and the like are written thereon at a density higher than that of the background portion. The signal level is plotted along the abscissa. Since the number of reading levels is 256, the left end corresponds to 0th level (darkest), and the right end corresponds to 255th level (lightest). The frequency is plotted along the ordinate, and is normally considered as the total frequency ratio (%).

The following four feature points of the histogram are obtained.

| | |
|---|---|
| lmin | darkest signal level |
| lmax | lightest signal level |
| lpeak | signal level corresponding to maximum frequency |
| hmax | maximum frequency |

In this histogram, a signal level (luminance signal level) range to have lpeak as the center corresponds to a background portion (non-information portion), and a range from lmin to the non-information portion corresponds to a character portion (an information portion of an original).

Figure 10:
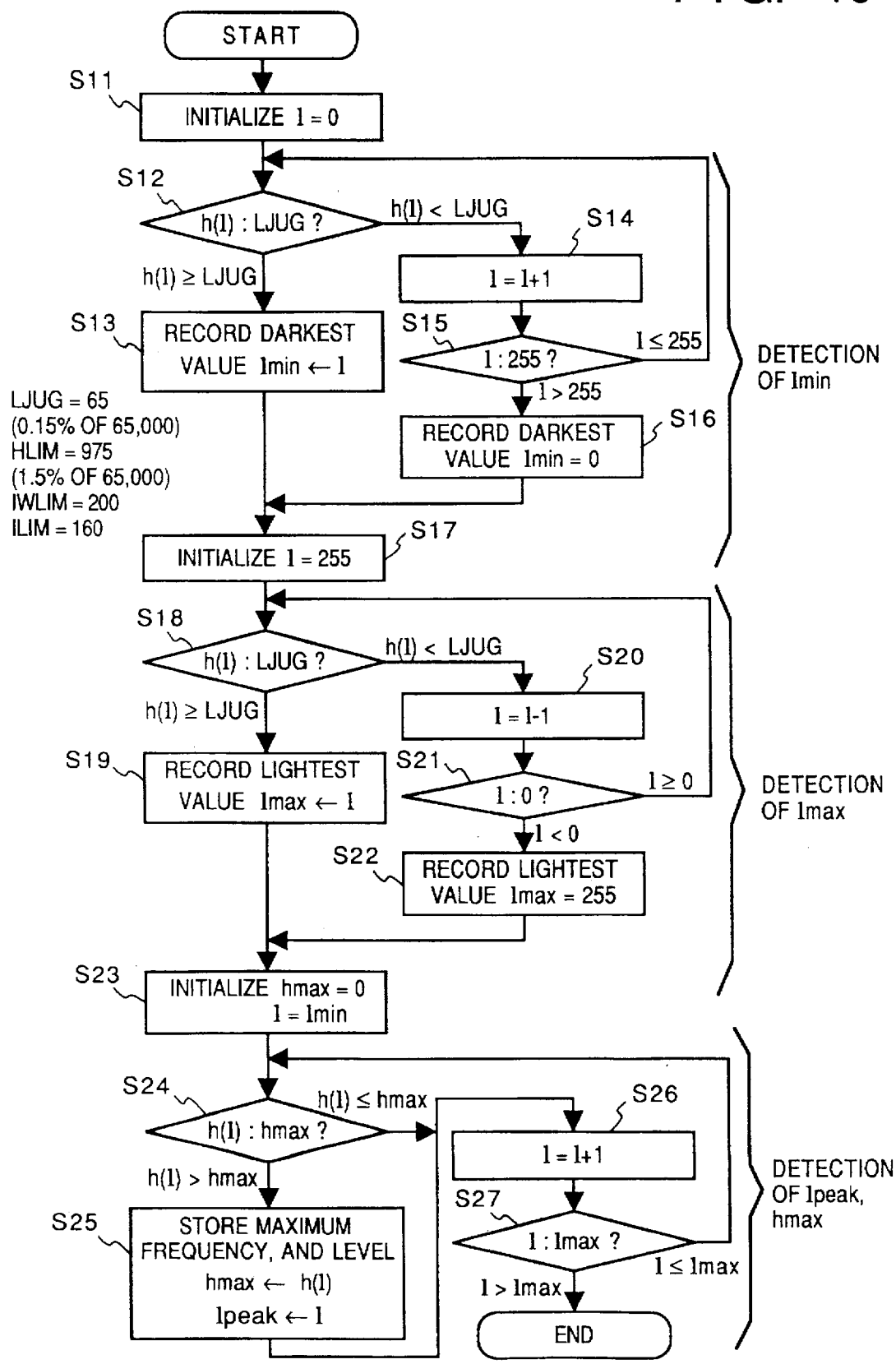
FIG. 10 is a flow chart for explaining an operation for obtaining feature points from a histogram.

FIG. 10 is a flow chart for obtaining feature points of a histogram according to the first embodiment. In FIG. 10, l represents the level, and h(l) represents the frequency. In detection of the darkest level lmin in steps S11 to S16, the frequencies h(l) according to levels l are sequentially checked from the 0th level toward the 255th level, and the level l of the frequency h(l) exceeding a discrimination reference frequency LJUG first is adopted. The discrimination reference frequency LJUG is used for eliminating a discrimination error caused by, e.g., noise upon formation of a histogram, and is set to be about 0.01% of the total frequency value. For example, if the total frequency value is 65,000, LJUG is 65, and a level having a frequency equal to or larger than 65 is detected.

In detection of the lightest level lmax, similarly, in steps S17 to S22, the frequencies are checked from the 255th level toward the 0th level, and the level of the frequency, which exceeds LJUG first, is adopted. When these levels cannot be detected for some reason, 0 is given to lmin, and 255 is given to lmax.

In steps S23 to S27, the maximum frequency hmax of the histogram, and the level lpeak of the maximum frequency are then detected from the range from lmin to lmax.

[Discrimination of Original Type (Formation of Conversion Table) (S3)]

Figure 11:
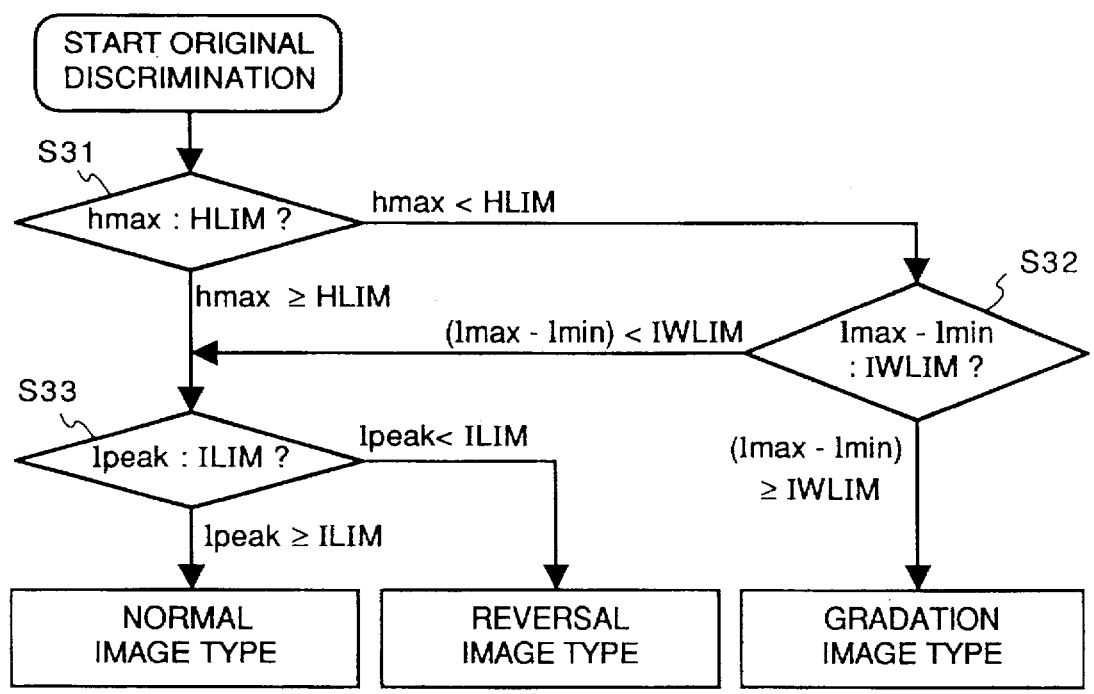
FIG. 11 is a flow chart for explaining an operation for discriminating an original type.

FIG. 11 is a flow chart for explaining an operation for discriminating an original type.

An original type is discriminated based on the feature point data of the histogram obtained in step S2. In this embodiment, the original type is classified to three types, i.e., a normal image type, a reversal image type, and a gradation image type, and a table for converting luminance signals according to a corresponding method is formed. This conversion table is formed to faithfully reproduce an original image of the corresponding type or to emphasize, e.g., the density.

Figure 12:
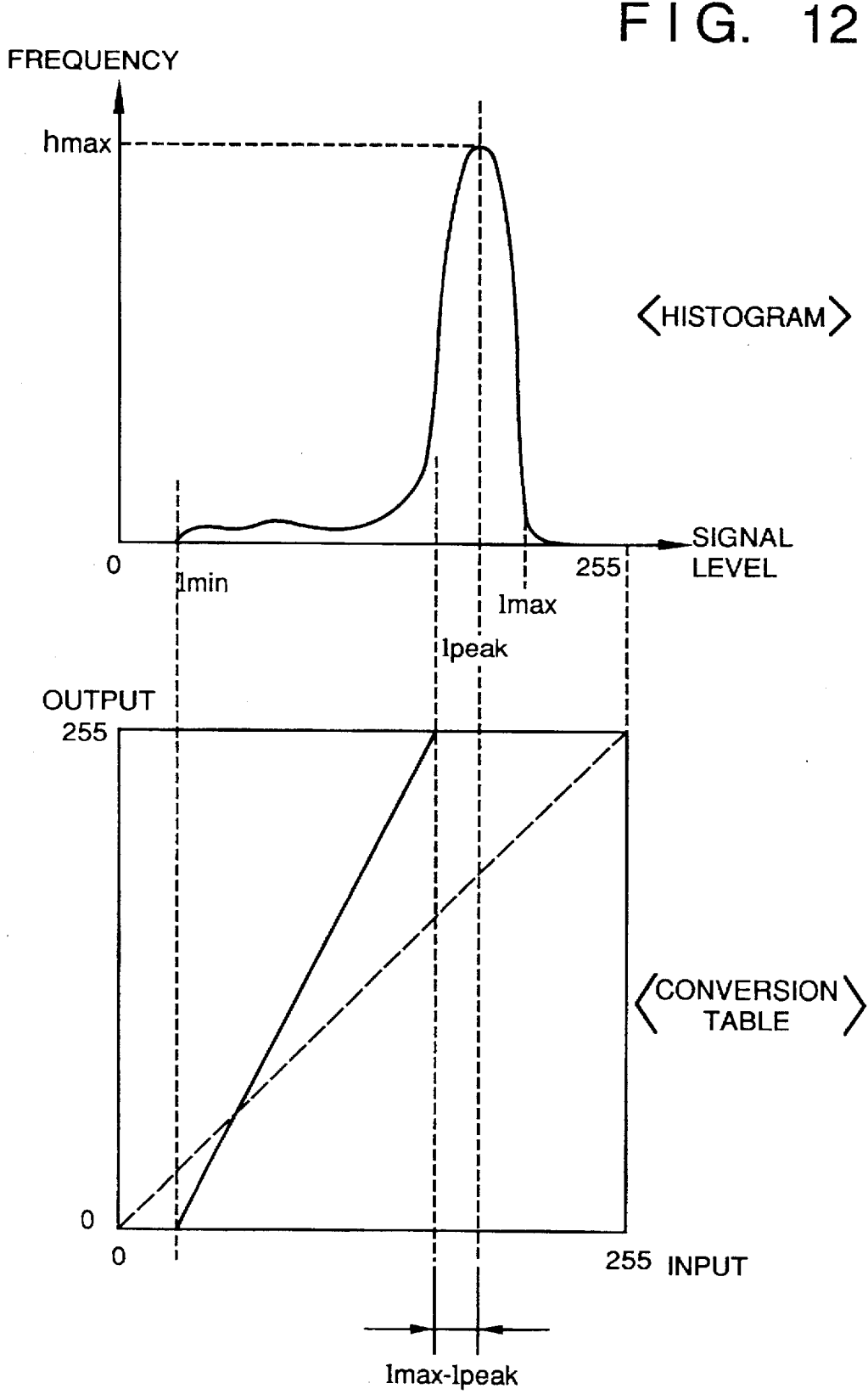
FIG. 12 is a graph showing a histogram of a normal image type, and its conversion table characteristics.

FIG. 12 shows a histogram of an original of the normal image type. An original of the type shown in FIG. 12 is the same as that shown in FIG. 9, and most of originals are included in this type. An original of this type is preferably subjected to processing for increasing the density of light characters written by, e.g., a pencil included in a character portion (information portion) without recording a background portion (non-information portion).

Figure 13:
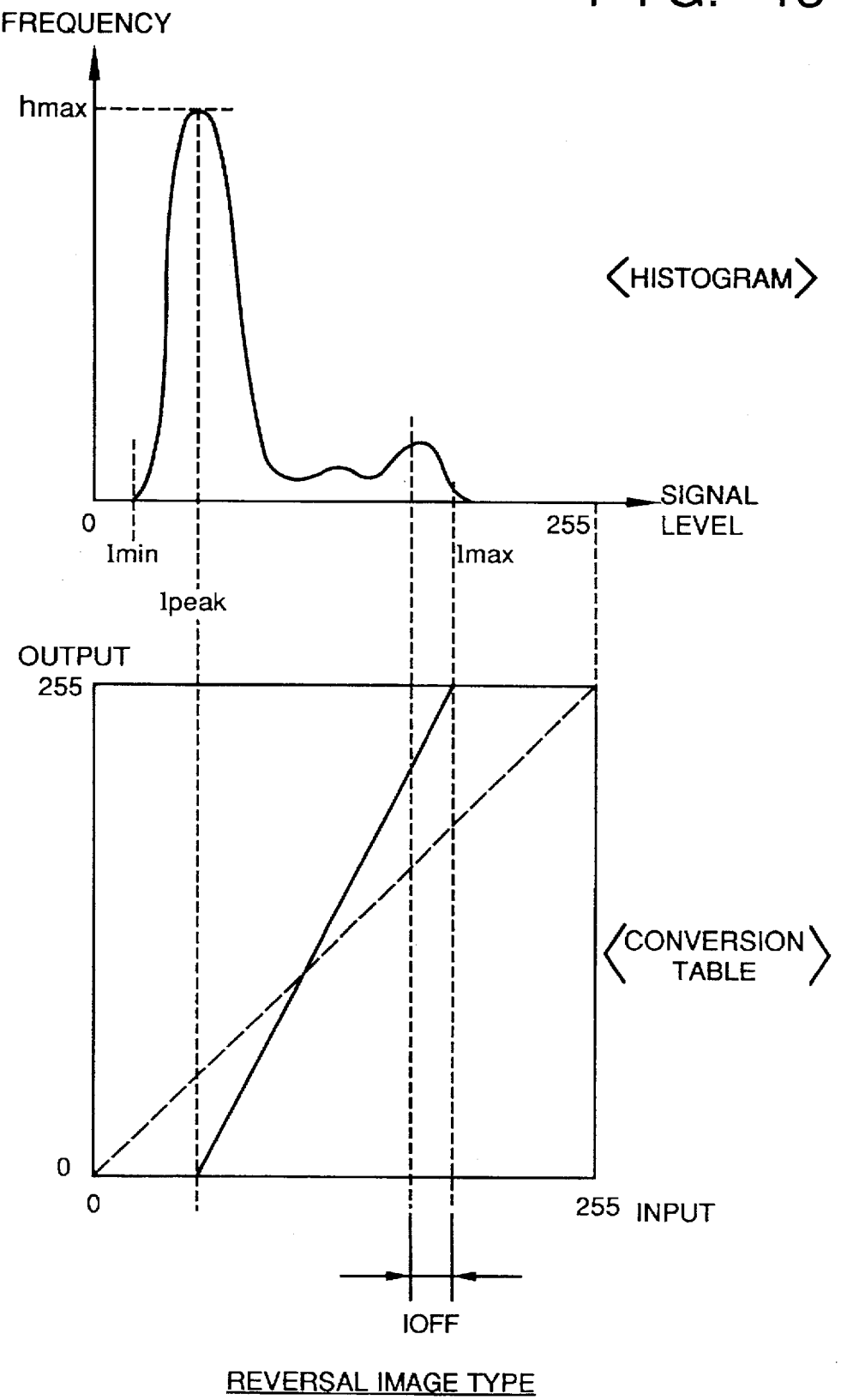
FIG. 13 is a graph showing a histogram of a reversal image type, and its conversion table characteristics.

FIG. 13 shows a histogram of an original of the reversal image type. An original of the type shown in FIG. 13 has a frequency peak in a direction opposite to that of an original of the normal image type, and corresponds to an original on which white characters are present on a solid-color background portion. An original of this type is preferably subjected to processing for recording a portion corresponding to the background portion (non-information portion) to be darker, and preventing slight background fogging of a white character portion.

Figure 14:
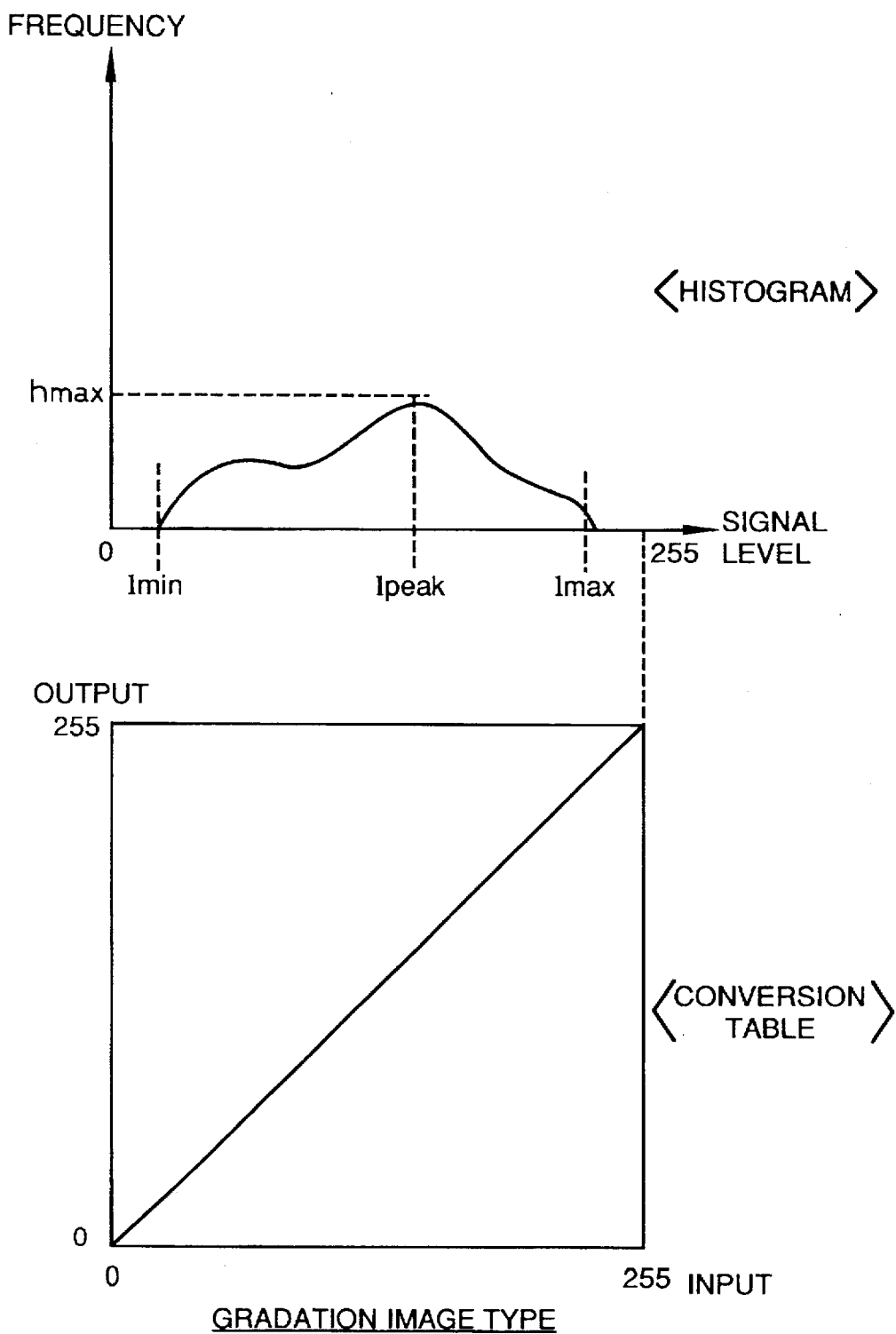
FIG. 14 is a graph showing a histogram of a gradation image type, and its conversion table characteristics.

FIG. 14 shows a histogram of an original of the gradation image type. An original of the type shown in FIG. 14 corresponds to an original such as a photograph having a smooth, continuous change in original density, and a conversion table preferably has linear input/output characteristics so as not to impair gradation characteristics.

The meanings of symbols in FIG. 11 will be listed below.

HLIM reference frequency for discriminating gradation image type

IWLIM discrimination reference level of information width for discriminating gradation image type ILIM discrimination reference level of normal image type and reversal image type In FIG. 11, in step S31, the maximum frequency hmax of the histogram is compared with the frequency HLIM. If the maximum frequency is smaller than the frequency HLIM, it is determined that an original type may be the gradation image type, and the information width is checked. The value of the frequency HLIM is determined to be about 1.5% of the total frequency value based on many image data. If the total frequency value is 65,000, the value of the frequency HLIM is 975.

In step S32, the information width is obtained from the values of the darkest level lmin and the lightest level lmax, and is compared with the level IWLIM. As a result, if the information width is larger than the level IWLIM, the original type is finally determined as the gradation image type. The value of the level IWLIM is determined in the same manner as the frequency HLIM, and is set to be 200 in this embodiment.

If a comparison result other than the above-mentioned comparison result with the frequency HLIM or the level IWLIM is obtained, the signal level lpeak of the maximum frequency is compared with the level ILIM to determine the normal or reversal image type in step S33. If the signal level lpeak is larger than the level ILIM, the normal image type is determined; otherwise, the reversal image type is determined. With this level ILIM, a background (non-information) density to be output or not to be output is determined. In this embodiment, the value of the level ILIM is set to be 160.

A conversion table is formed as follows according to the image type discriminated as described above. FIGS. 12 to 14 show the characteristics of conversion tables.

FIG. 12 shows the conversion table of the normal image type.

A level corresponding to a background portion (non-information portion) is obtained. When the non-information density is uniform, since it is considered that the density has a distribution axially symmetrical about the maximum frequency level lpeak, the non-information level is determined by subtracting lmax−lpeak from lpeak.

The conversion table is obtained by the following relations:

$$Iin \geq lpeak-(lmax-lpeak) \rightarrow Iout=255$$

$$Iin \leq lmin \rightarrow Iout=0$$

$$others \rightarrow Iout=255 \times (Iin-lmin)/(lpeak-(lmax-lpeak)-lmin)$$

where Iin is the input level, and Iout is the output level.

FIG. 13 shows the conversion table of the reversal image type.

Since the non-information portion must be emphasized to be darker, a level portion lower than the level lpeak is converted to 0 level. In order to eliminate fogging of a white character portion of the reversal image, IOFF is used as an offset level from the lightest level. In this case, "10" is set.

The conversion table is obtained by the following relations:

$$Iin \geq lmax-IOFF \rightarrow Iout=255$$

$$Iin \leq lpeak \rightarrow Iout=0$$

$$others \rightarrow Iout=255 \times (Iin-lpeak)/(lmax-IOFF-lpeak)$$

where Iin is the input level, and Iout is the output level.

FIG. 14 shows the conversion table of the gradation image type.

In order to maintain gradation characteristics, a linear conversion table is formed. That is, the table is expressed by:

$$Iout=Iin$$

[Formation of γ Table (S4)]

The final γ table is formed based on the conversion table obtained in the processing in steps S1 to S3.

The density correction unit 36 (FIG. 3) performs density conversion and gradation conversion for correcting the gradation characteristics of a printer using an LUT (look-up table). In the density conversion processing, the read luminance signals are converted into density signals, and this processing is generally called "log conversion". The log conversion table is calculated from the following equation:

$$Dout=-255/DMAX*LOG(Din/255)$$

A gradation correction table will be described below.

Figure 15A:
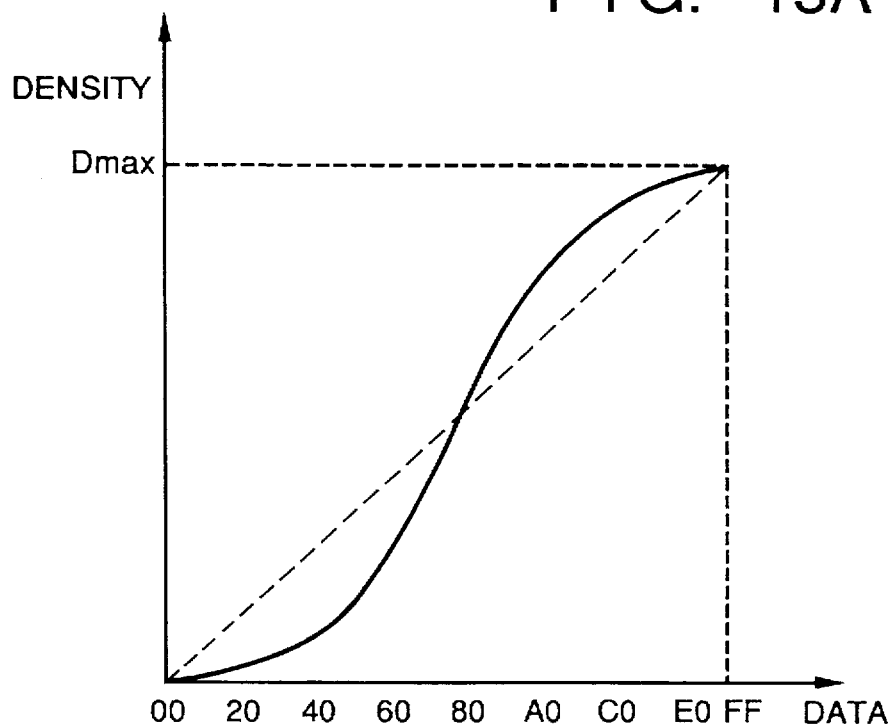
FIG. 15A is a graph showing the gradation characteristics of a printer.
Figure 15B:
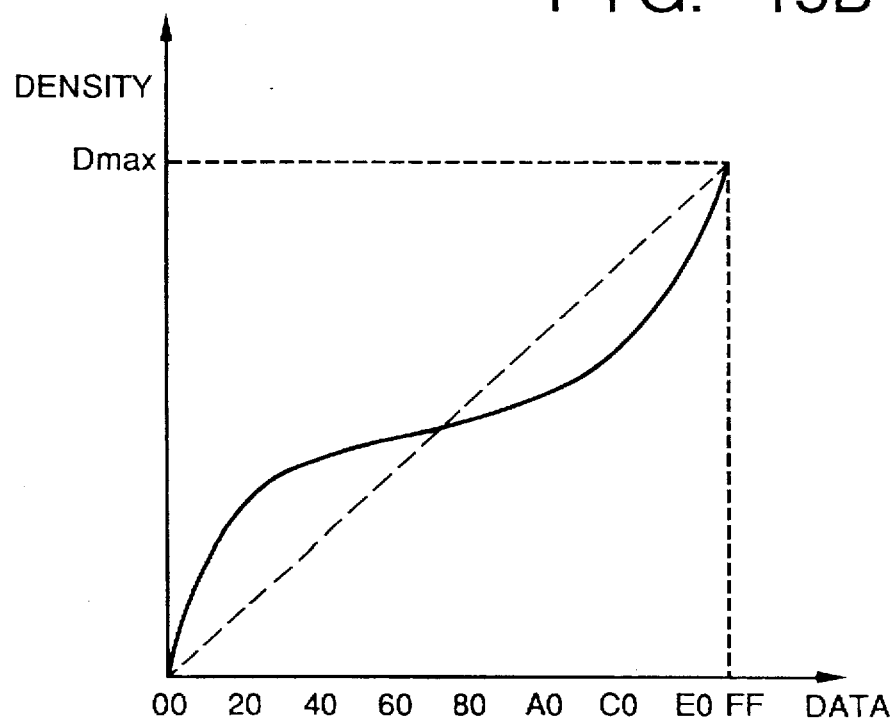
FIG. 15B is a graph showing the conversion table characteristics thereof.

The gradation correction table corrects the gradation characteristics of a printer. FIG. 15A shows an example of gradation characteristics of an electrophotography printer. FIG. 15B shows the characteristics of a correction table for the gradation characteristics shown in FIG. 15A.

The gradation correction table is expressed by:

Correction data=gradation correction $(-255/DMAX*LOG(Din/255))$

The conversion tables for density conversion and gradation correction obtained as described above are stored in the ROM of the CPU as tables, and optimal data are selected. Furthermore, the luminance signal conversion table obtained by the AE processing is combined with these tables to form a final table. These processing operations are executed according to a program of the CPU.

The density correction unit 36 comprises a programmable storage element such as a RAM, and is written with the obtained γ table data from the CPU. The γ table data are calculated every time an original is exchanged, and are written in the density correction unit 36.

Second Mode

In the main scan operation, an original image is reproduced using the conversion table corresponding to the original type and the γ table respectively obtained in steps S2 and S4 by the pre-scan operation. In this manner, when an original is copied, reproduction signals of the original are generated according to the two tables formed by the pre-scan operation.

As described above, according to this embodiment, a histogram of an original is formed, and a luminance signal conversion table is formed based on feature point data of the histogram. Then, LUTs including a log conversion table and a gradation correction table for a printer are formed. In this manner, an original density and type can be automatically determined, and an original image can be faithfully reproduced without selecting a density button or an original type selection button unlike in the prior art.

An original image can be recorded while emphasizing a light information portion (character portion) to be darker without recording an unnecessary portion (a background portion, i.e., a non-information portion). An original having gradation characteristics (an original such as a photograph having a slow change in density level) can be recorded without impairing gradation characteristics.

When an original obtained after repetitive copying operations is to be copied, since optimal conversion tables are formed for the original, a copy, which suffers from less blurring of characters or deterioration of image quality, can be obtained.

<Second Embodiment>

Another AE processing according to the second embodiment of the present invention will be described below. Since this embodiment has the same arrangement as that corresponding to FIGS. 1 to 7B described in the first embodiment, a detailed description thereof will be omitted. Since individual operations in the flow chart shown in FIG. 8 are different from those in the first embodiment, the differences will be explained mainly below. The AE processing of this embodiment is executed in the order of formation of a histogram (S1'), detection of feature points of the histogram (S2'), discrimination of an original type (S3'), and formation of a γ table (S4'). Thus, step S2' and subsequent steps different from those in the first embodiment will be described below.

[Detection of Feature Points of Histogram (S2')]

In the second embodiment, in order to analyze a histogram pattern in detail, all peaks of the histogram are obtained. The method of obtaining the peaks will be briefly described below. Signal levels are sequentially checked from the 0th level to 255th level, and when the frequency of the level of interest is equal to or larger than a peak discrimination reference value YLIM, and is larger than frequencies of the levels immediately before and after the level of interest, the level of interest is recognized as a peak by setting "1" in the corresponding level number of an array pdata. In this embodiment, the value YLIM is set to be 0.03% of the total frequency value. The array pdata has 256 areas, and is initialized to "0" in advance.

The following data are obtained as feature points of the histogram.

peakn . . . total number of peaks
lpeakn . . . total number of peaks of dark portion
rpeakn . . . total number of peaks of light portion
Imax . . . signal level corresponding to maximum frequency
llight . . . lightest signal level
Idark . . . darkest signal level
rpeak . . . darkest peak of peaks recognized as peaks of background portion in light portion
rwidth . . . continuous amount of frequencies having largest width of regions where frequencies exceeding given level continuously appear In this histogram, a range of signal levels (luminance signal levels) to have Imax as a center corresponds to a background portion (non-information portion), and a range from Idark to the non-information portion corresponds to a character portion (an information portion of an original).

The method of obtaining these data will be described below.

In order to detect peakn, the array pdata is sequentially checked from 0 to 255, and the number of levels recognized as peaks is obtained.

In order to detect lpeakn, the array pdata is sequentially checked from 0 to a threshold value ILIM between the dark and light portions, and the number of levels recognized as peaks is obtained.

In order to detect rpeakn, the array data is sequentially checked from 255 to the threshold value ILIM between the dark and light portions, and the number of levels recognized as peaks is obtained.

In order to detect rpeak, the array data is sequentially checked from 255 to the threshold value ILIM between the dark and light portions, and a level value of an n-th detected peak (when rpeakn>n) or an (rpeakn)-th detected peak (when rpeakn<n) is adopted.

In order to detect the darkest level Idark, the frequencies are sequentially checked from the 0th level toward the 255th level, and the level of the frequency, which exceeds a discrimination reference frequency doslim first, is adopted. This discrimination reference frequency doslim is used for eliminating a discrimination error caused by, e.g., noise upon formation of a histogram, and is set to be about 0.01% of the total frequency value. For example, if the total frequency value is 65,000, the frequency doslim is 65, and a level having a frequency equal to or larger than 65 is detected.

In order to detect the lightest level llight, similarly, the frequencies are sequentially checked from the 255th level toward the 0th level, and the level of the frequency, which exceeds doslim first, is adopted. If these levels cannot be detected for some reason, "0" is given to Idark, and "255" is given to llight.

The maximum frequency hmax and the level Imax at that time are obtained by detecting the maximum frequency within a range from the Idark to llight.

In order to detect rwidth, the frequencies are sequentially checked from the 0th level toward the 255th level, a period having the maximum width of levels is obtained from periods where frequencies equal to or larger than doslim continuously appear, and the continuous amount of the frequencies in the period is adopted.

[Discrimination of Original Type (Formation of Conversion Table) (S3')]

Figure 16:
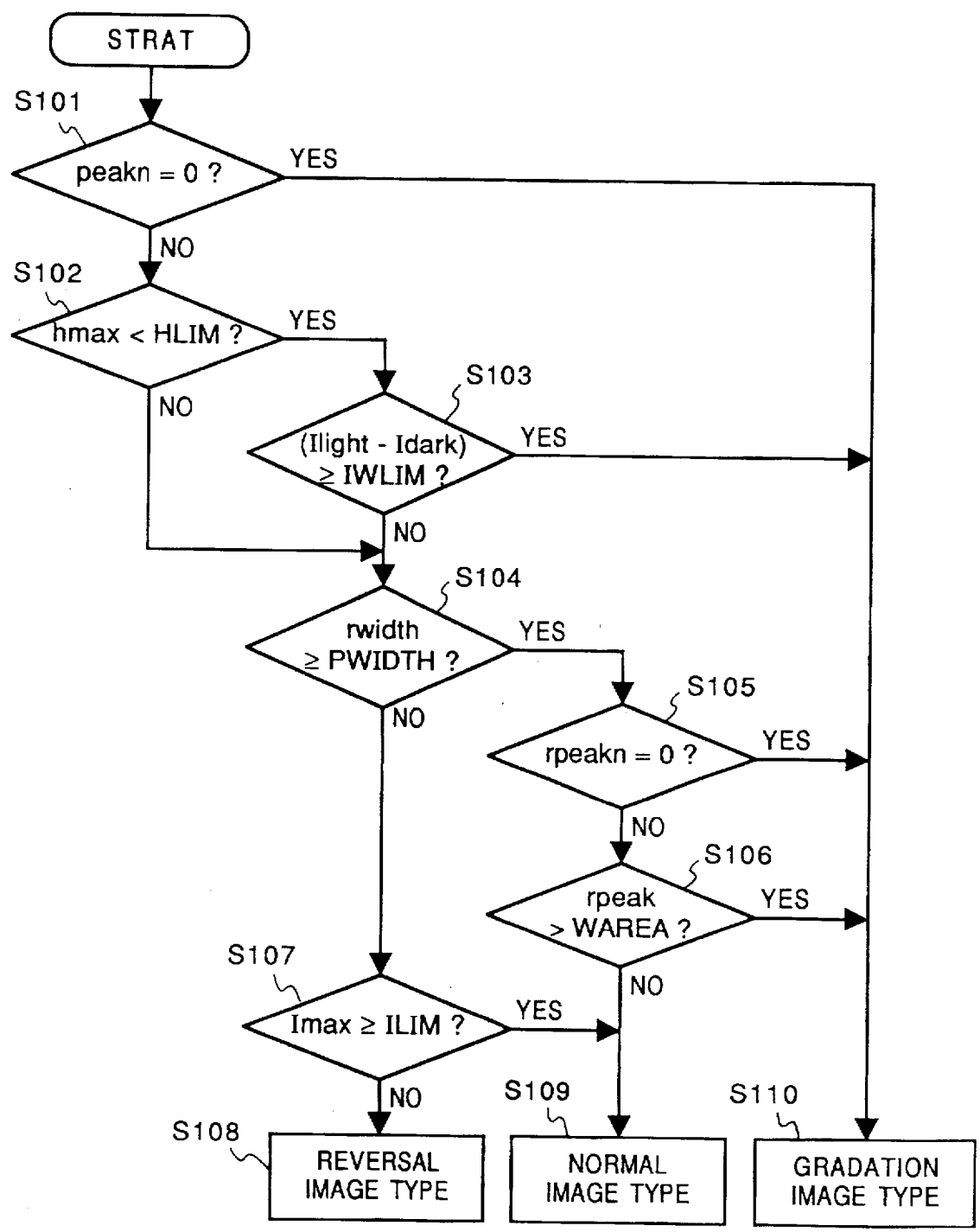
FIG. 16 is a flow chart for explaining an operation for discriminating an original type according to a second embodiment of the present invention.

FIG. 16 is a flow chart for explaining an operation for discriminating an original type according to this embodiment. An original type is discriminated based on feature point data of the histogram, which are obtained in step S2'. In this embodiment, an original type is classified to three types, i.e., a normal image type, a reversal image type, and a gradation image type, and a table for converting luminance signals by the corresponding method is formed.

The conversion table is formed to faithfully reproduce an original image of the corresponding type or to emphasize, e.g., the density, and is used for converting luminance signals.

Figure 17:
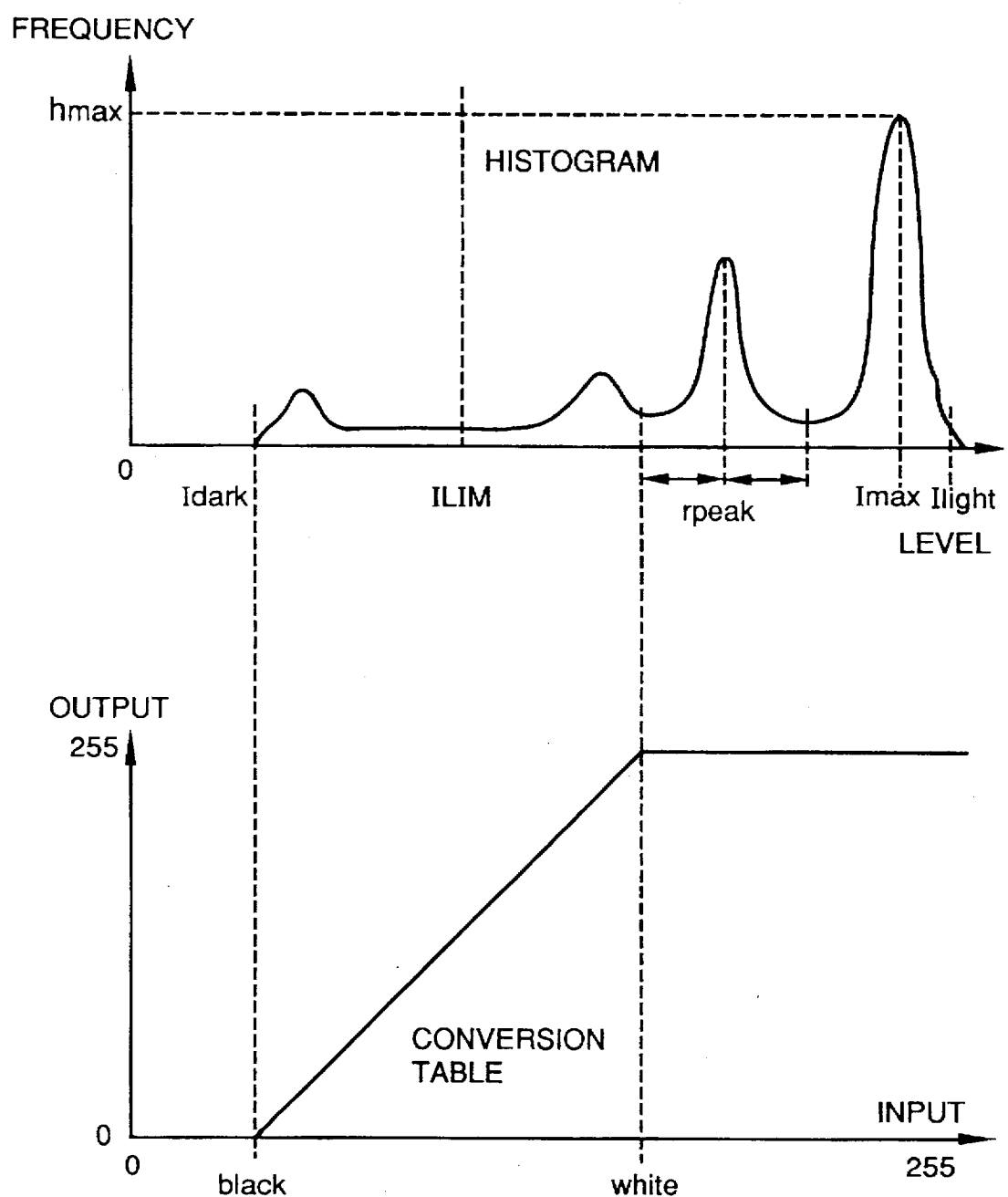
FIG. 17 is a graph showing a normal image type original in the second embodiment.

FIG. 17 shows a histogram of an original of the normal image type in this embodiment. As shown in FIG. 17, an original of the normal image type is preferably subjected to processing for increasing the density of light characters written by, e.g., a pencil included in a character portion (information portion) without recording a background portion (non-information portion). Most of originals are included in this type.

Figure 18:
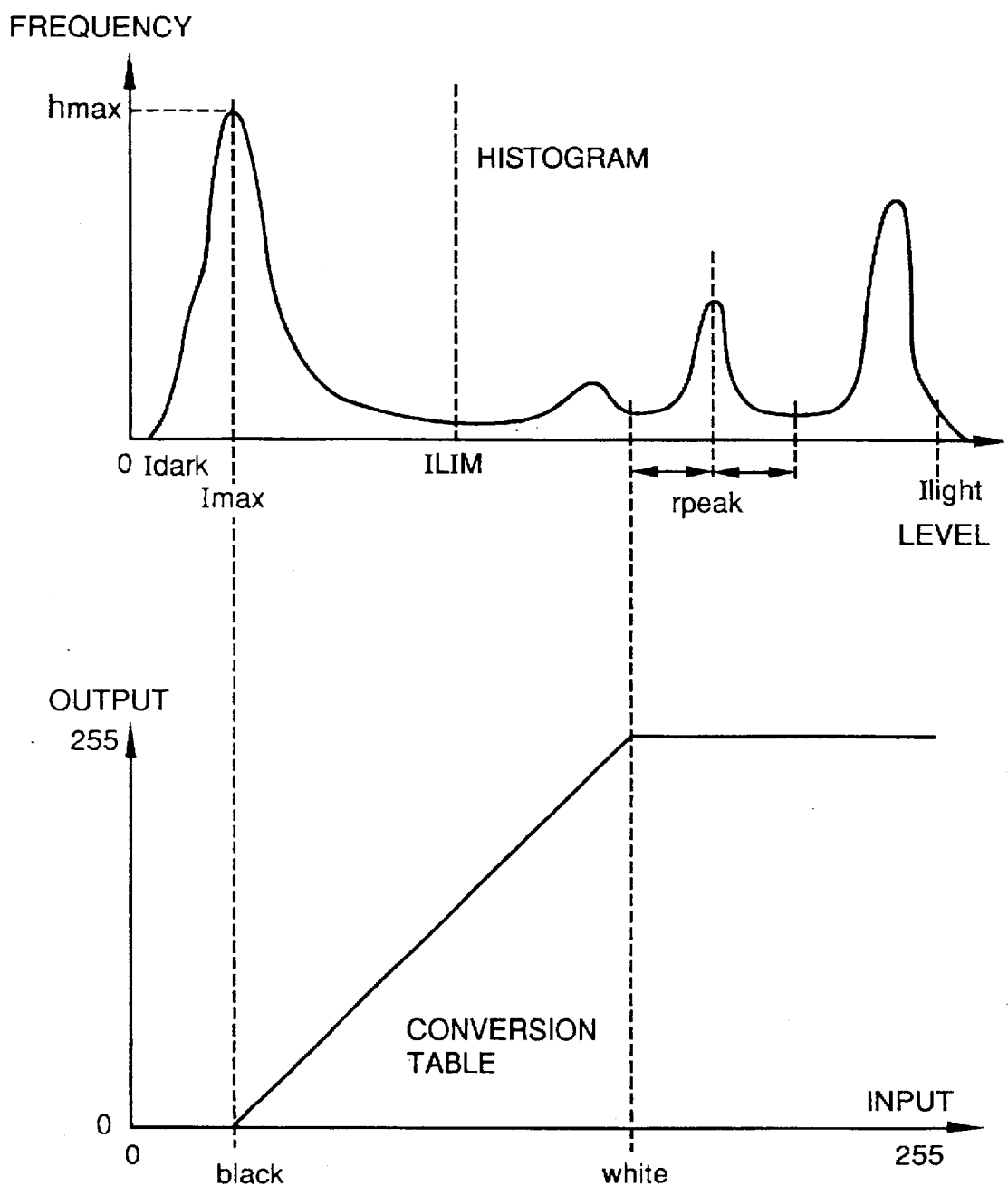
FIG. 18 is a graph showing a reversal image type original in the second embodiment.

FIG. 18 shows a histogram of an original of the reversal image type in this embodiment. As shown in FIG. 18, an original of the reversal image type has a frequency peak in a direction opposite to that of an original of the normal image type, and corresponds to an original on which white characters are present on a solid-color background portion. An original of this type is preferably subjected to processing for recording a portion corresponding to the background portion (non-information portion) to be darker, and preventing slight background fogging of a white character portion.

FIG. 19 shows a histogram of an original of the gradation image type in this embodiment. As shown in FIG. 19, an original of the corresponds to type corresponds to an original such as a photograph having a smooth, continuous change in original density, and a conversion table preferably has linear input/output characteristics so as not to impair gradation characteristics.

The meanings of symbols in FIG. 16 will be listed below.

HLIM . . . reference frequency for discriminating gradation image type
ILIM . . . discrimination reference level of normal image type and reversal image type
IWLIM . . . discrimination reference level of information width for discriminating gradation image type
PWIDTH . . . discrimination reference level of continuity for discriminating gradation image type
WAREA . . . discrimination reference level of normal image type and gradation image type In FIG. 16, it is checked in step S101 if the total number peakn of peaks is 0. If YES in step S101, the gradation image type is determined in step S110. However, if it is determined in step S101 that the total number of peaks is equal to or larger than 1, the maximum frequency hmax of the histogram is compared with HLIM in step S102. If the maximum frequency is smaller than HLIM, the information width is checked in step S103. The value of HLIM is determined to be about 1.5% of the total frequency value based on many pieces of image data. If the total frequency value is 65,000, the value of HLIM is 975.

The information width is then calculated from the values of the darkest level Idark and the lightest level Ilight, and is compared with IWLIM. If the information width is equal to or larger than IWLIM, the gradation image type is determined in step S110. The value of IWLIM is determined in the same manner as HLIM, and is set to be 200 in this embodiment.

If hmax is equal to or larger than HLIM, and if the information width is smaller than IWLIM, rwidth and PWIDTH are compared with each other in step S104. If rwidth is equal to or larger than PWIDTH, step S105 is executed; otherwise, step S107 is executed. The value of PWIDTH is set to be 60 on the basis of many pieces of image data in this embodiment. It is checked in step S105 if the number rpeakn of peaks of the light portion is 0. If YES in step S105, the gradation image type is determined. However, if it is determined in step S105 that rpeakn is equal to or larger than 1, rpeak is compared with WAREA in step S106. If rpeak is larger than WAREA, the gradation image type is determined. However, if rpeak is equal to or smaller than WAREA, the normal image type is determined.

The value of WAREA is set to be 192 in this embodiment. In general, since frequencies equal to or larger than a given level continuously appear in a histogram of a gradation image, the gradation image can be determined by checking if the histogram includes such a continuous region. However, with this method, a newspaper original, which should be determined as a normal original, may be erroneously determined as a gradation image. In the case of a newspaper original, since the peak of a background color portion of a newspaper appears in a light portion, the newspaper original can be prevented from being determined as a gradation original by checking the conditions in steps S105 and S106.

If it is determined in step S104 that rwidth is smaller than PWIDTH, the signal level Imax of the maximum frequency is compared with ILIM. If Imax is equal to or larger than ILIM, the normal image type is determined; otherwise, the reversal image type is determined.

With the ILIM, a background (non-information) density to be output or not to be output is determined. In this embodiment, the value of ILIM is set to be 130.

A conversion table is formed according to the discriminated image type. If the input level is represented by Iin, and the output level is represented by Iout, the conversion table is expressed by the following relations (2):

When *Iin*<black, *Iout*=0

When black≦*Iin*≦white,

Iout=(255/(white−black))*(*x*−black)

When *Iin*>white, *Iout*=255 (2)

A method of obtaining black and white in relations (2) will be explained below in correspondence with the image types.
<Normal Image Type>

Figure 20:
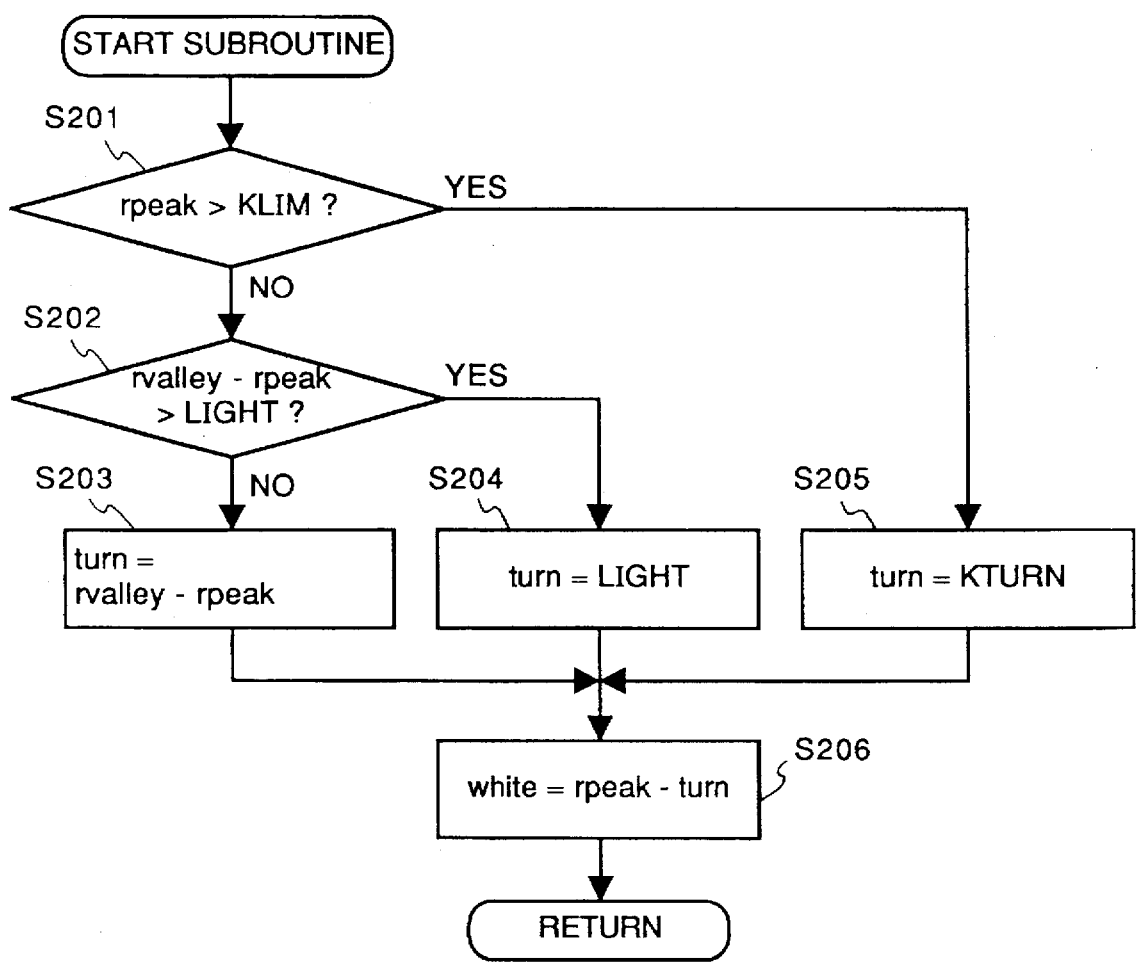
FIG. 20 is a flow chart showing a subroutine for obtaining "white" level of the normal image type in the second embodiment.

FIG. 20 is a flow chart showing a subroutine for obtaining white of the normal image type in this embodiment. In step S201, rpeak is compared with a fogging prevention reference value KLIM. If rpeak is larger than KLIM, a turn value KTURN is set in step S205; otherwise, processing in step S202 is executed. The value of KTURN is set to be 4 in this embodiment.

In step S202, the difference between rvalley and rpeak is compared with LIGHT. LIGHT is a limit value of a turn amount for preventing overwhitening of a non-information portion, and is set to be 16 in this embodiment. When rpeakn is 1, rvalley corresponds to Ilight; when rpeak is not the lightest one of peaks appearing in a light portion, the levels are sequentially checked from rpeak toward the next lightest peak, and a level, which becomes smaller than doslim first, or a level having the minimum frequency in the period is determined as rvalley. If the condition in step S202 is satisfied, a turn value turn is set to be LIGHT in step S204; otherwise, a difference obtained by subtracting rpeak from rvalley is set as the turn value turn in step S203.

After these processing operations, a value obtained by subtracting turn from rpeak is set in white in step S206.

A method of obtaining black will be described below.

Figure 21:
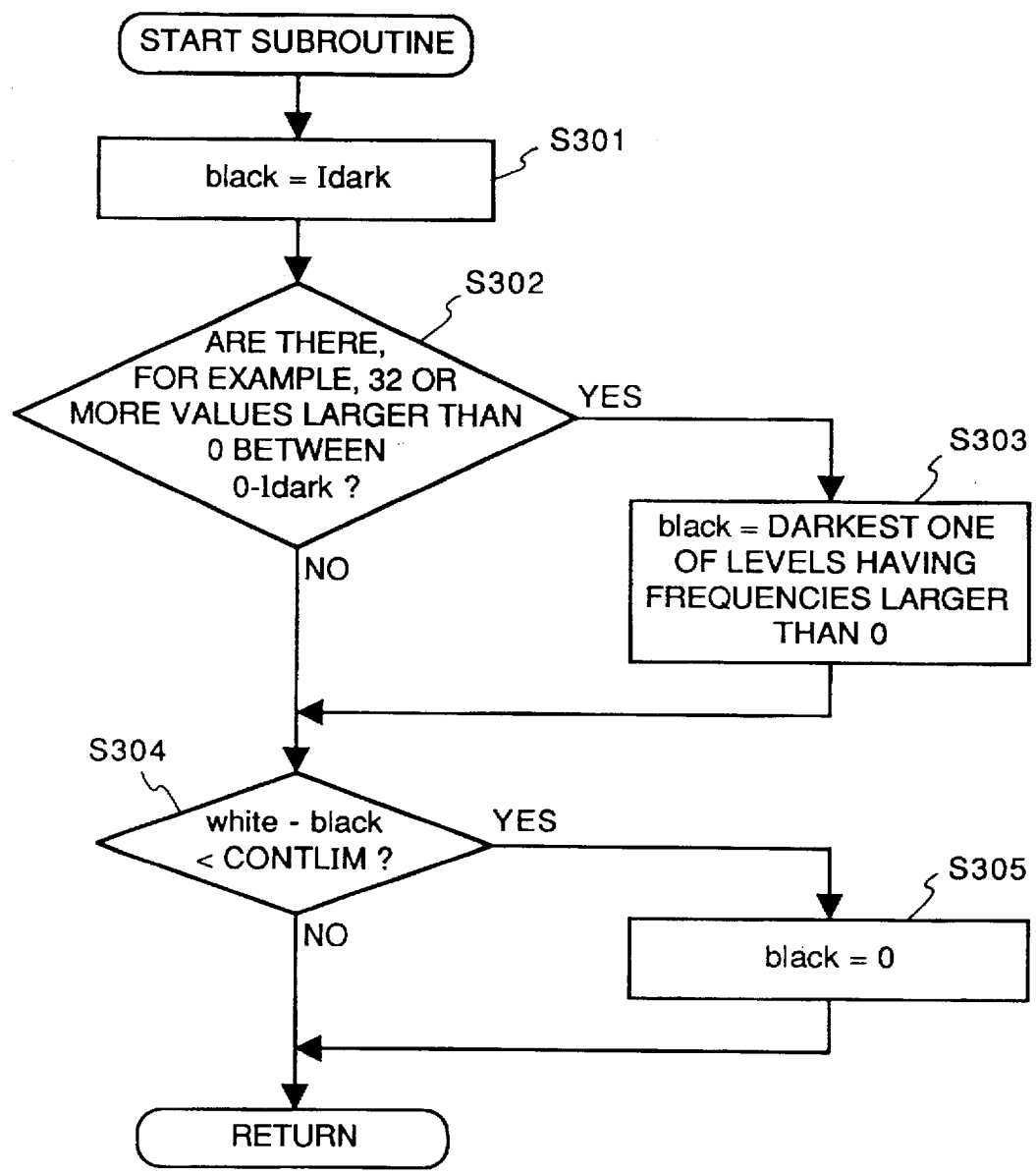
FIG. 21 is a flow chart showing a subroutine for obtaining "black" level of the normal image type in the second embodiment.

FIG. 21 is a flow chart showing a subroutine for obtaining black of the normal image type in this embodiment.

Since Idark is the darkest level, black is preferably equal to Idark. However, when some levels each having a frequency smaller than the threshold value doslim for determining noise are present between 0 and Idark, it is preferable to prevent emphasis of noise by correcting Idark. Thus, black=Idark is set (S301), and the number of levels having frequencies equal to or larger than 0 is checked between 0 to Idark. For example, if the number of levels is equal to or larger than 32 (S302), the darkest one of levels having frequencies larger than 0 is set as Idark (S303).

In step S304, a value obtained by subtracting black from white is compared with a smallest value CONTLIM of a level width to be provided with a contrast. If the difference is smaller than CONTLIM, black is set to be 0 in step S305. This is to prevent overemphasis of the contrast due to too small an interval between white and black when an original consists of only a non-information portion, or when the density of an original is very low. Note that CONTLIM is set to be 55 in this embodiment.
<Reversal Image Type>

A method of forming a conversion table of the reversal image type will be described below.

Figure 22:
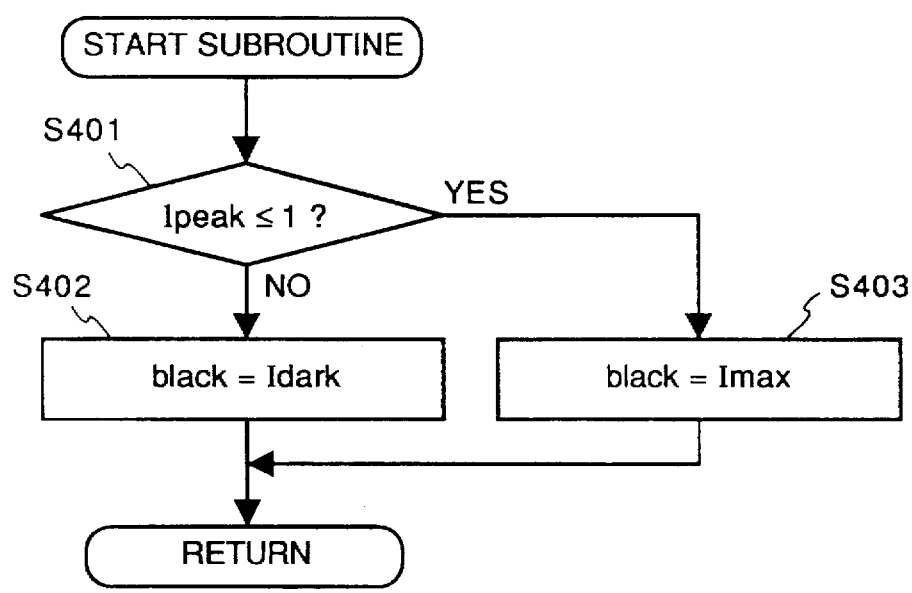
FIG. 22 is a flow chart showing a subroutine for obtaining "black" level of the reversal image type in the second embodiment.

FIG. 22 is a flow chart showing a subroutine for obtaining black of the reversal image type in this embodiment. If it is determined in step S401 that peakn is larger than 1, Idark is set as black in step S403; otherwise, Imax is set as black in step S402.

Figure 23:
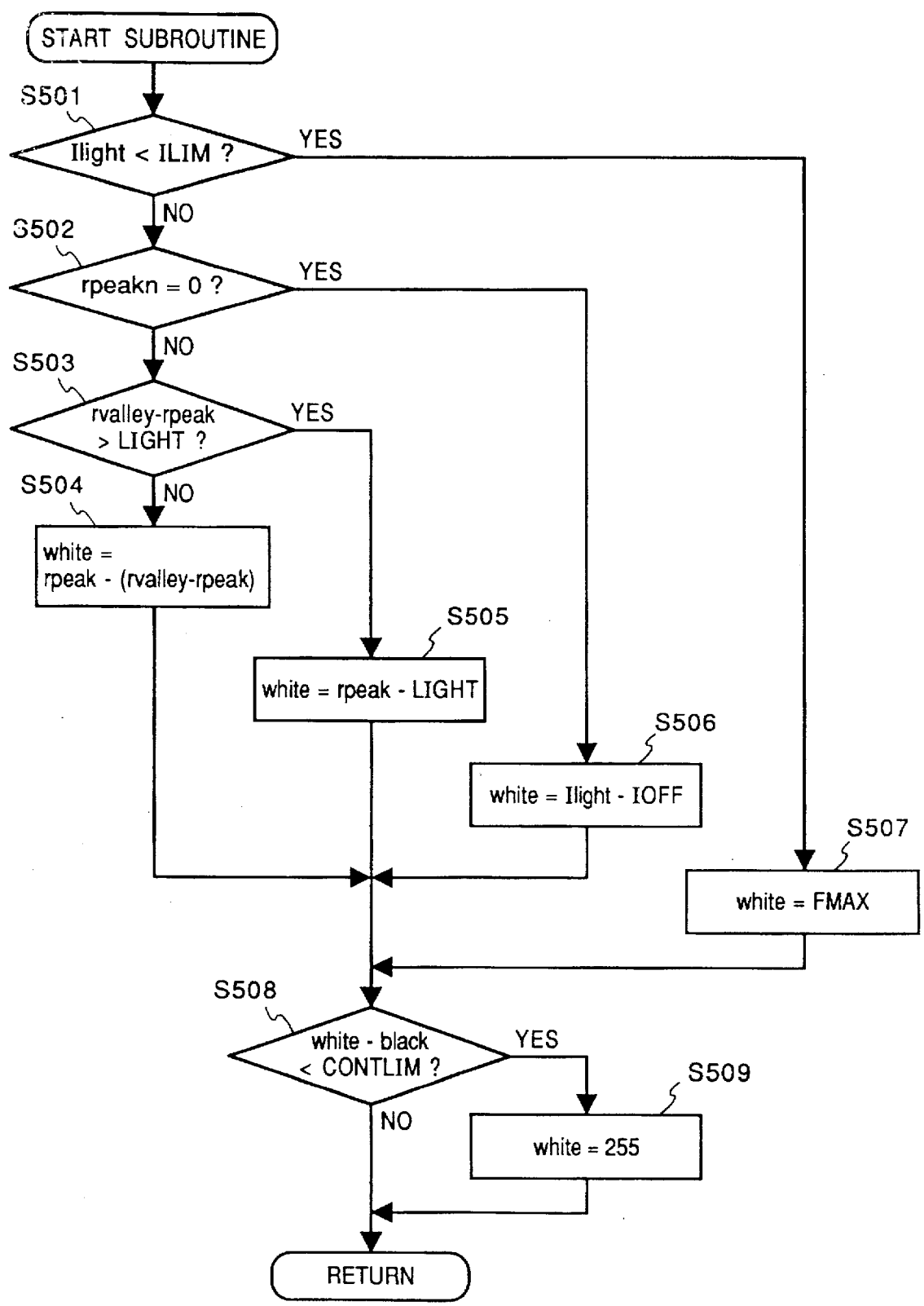
FIG. 23 is a flow chart showing a subroutine for obtaining "white" level of the reversal image type in the second embodiment.

FIG. 23 is a flow chart showing a subroutine for obtaining white of the reversal image type in this embodiment. In step S501, Ilight is compared with ILIM. If Ilight is smaller than ILIM, white is set to be 255 in step S507. If Ilight is equal to or larger than ILIM, the number rpeakn is checked in step S502. If rpeakn=0, a value obtained by subtracting IOFF from Ilight is set as white in step S506; otherwise, a value obtained by subtracting rpeak from rvalley is compared with LIGHT in step S503. If rvalley—rpeak is larger than LIGHT, a value obtained by subtracting LIGHT from rpeak is set as white in step S505; otherwise, rpeak—(rvalley—rpeak) is set as white. IOFF is a value used for preventing fogging of a white character portion of a reversal image, and is set to be 10 in this embodiment.

If it is then determined in step S508 that the difference between white and black is smaller than the contrast width CONTLIM, white is set to be 255 in step S509.
<Gradation Image Type>

As can be seen from the conversion table of the gradation image type shown in FIG. 19, since gradation characteristics must be maintained, a linear conversion table is formed. For this purpose, black is set to be 0, and white is set to be 255.

As described above, according to the second embodiment as well, the same effect as in the first embodiment can be obtained. After a first mode attained by a pre-scan operation, processing in a second mode attained by a main scan operation is executed. The operation in this mode is the same as that in the first embodiment, and a detailed description thereof will be omitted.

<Third Embodiment>

In the embodiments described above, data are temporarily written in a memory, and are read out by the CPU circuit unit to form a histogram. Such processing can also be realized by a hardware circuit arrangement shown in FIG. 24. Portions other than those to be described below are the same as those in the above embodiments, and a detailed description thereof will be omitted.

Figure 24:
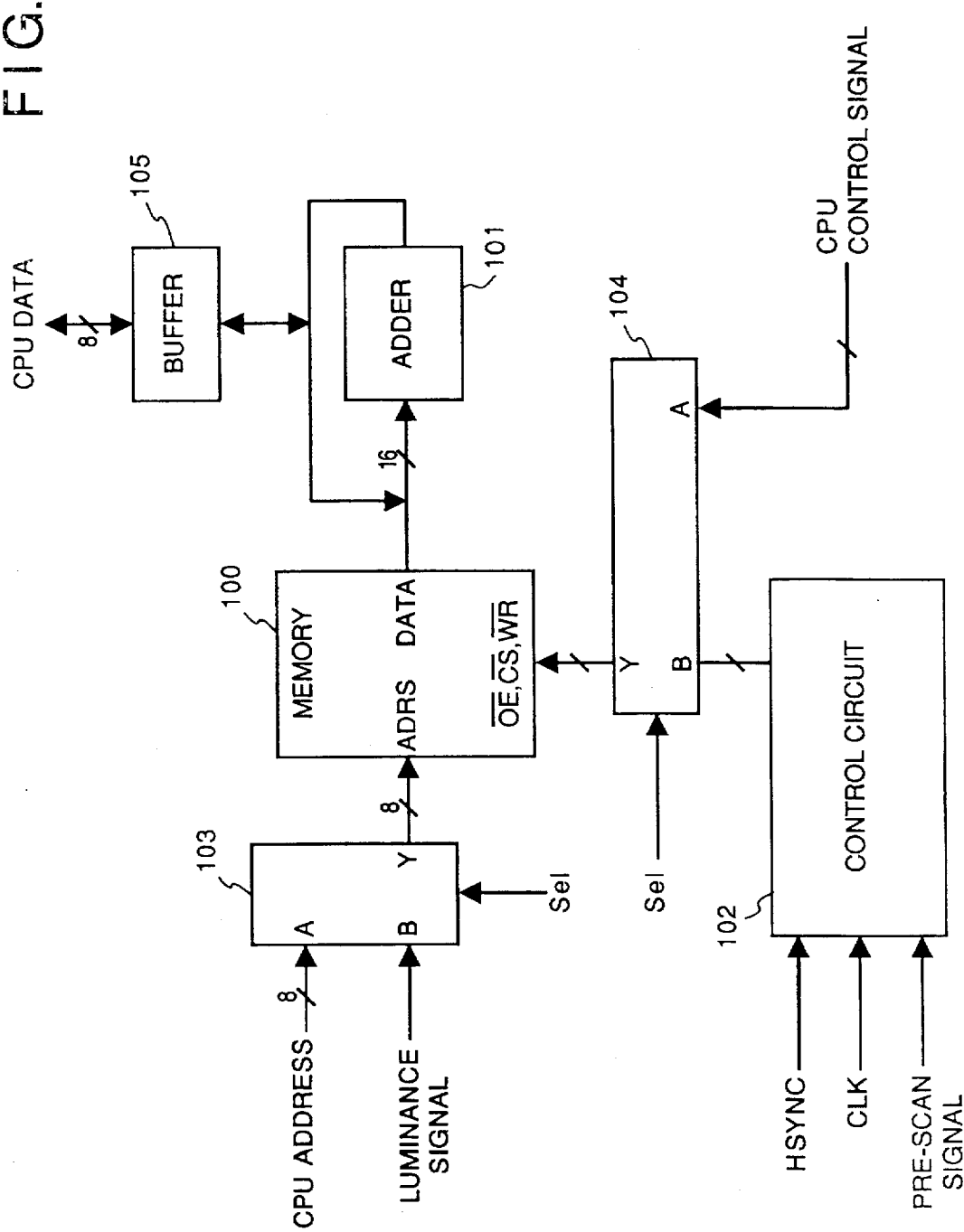
FIG. 24 is a block diagram showing an arrangement of a histogram forming unit according to a third embodiment of the present invention.

FIG. 24 is a block diagram showing an arrangement of a histogram forming unit according to the third embodiment of the present invention.

Referring to FIG. 24, reference numeral 100 denotes a programmable memory such as a RAM, which has a capacity of 256 words. Reference numeral 101 denotes an adder circuit for incrementing the readout content of the memory by 1, and rewriting the incremented content in the memory. Reference numeral 102 denotes a control circuit for generating a write signal for writing luminance signals obtained in a pre-scan operation in the memory 100 at designated sampling intervals. The sampling interval and range are set by a CPU.

Reference numerals 103 and 104 denote data selectors for selecting hardware control or CPU circuit unit control according to a sel signal from the CPU circuit unit. Reference numeral 105 denotes a buffer for controlling the direction of data when data is read out by the CPU circuit unit.

In the description of each of the embodiments described above, the pre-scan speed is set to be an equal-magnification speed in a read mode, the histogram forming range is set to be an A4-size range, and the sampling intervals in the main scan and sub-scan directions are set to be 1 mm. However, the present invention is not limited to these.

The pre-scan speed may be increased to shorten the pre-scan time. In this case, sampling can be performed for a range elongated in the sub-scan direction, and a histogram can be formed for a range wider than that can be obtained by the pre-scan operation at the equal-magnification speed.

The sampling interval is not limited to 1 mm, but may be, e.g., about 2 to 3 mm. The sampling range is not limited to an A4-size range. That is, when a histogram is formed for a range according to an original size, it can express the characteristics of the original itself better.

In each of the above embodiments, histogram data obtained in detection of feature points of a histogram are directly used. However, the frequencies of adjacent signal levels may be averaged to execute conversion processing. For example, a range of three to five pixels may be used. In this case, a discrimination error can be eliminated.

In each of the above embodiments, the darkest and lightest levels are obtained using a level having a frequency 0.15% of the total frequency value as a detection reference level. In place of the reference level, a detection level may be determined when frequency levels of a certain signal level continuously appear.

The detection reference level may be determined by defining the maximum frequency as 100%.

In each of the above embodiments, different conversion tables are prepared in correspondence with original types. Alternatively, as shown in FIGS. 25A and 25B, an optimal conversion table may be calculated by setting corresponding offset values.

Figure 25A:
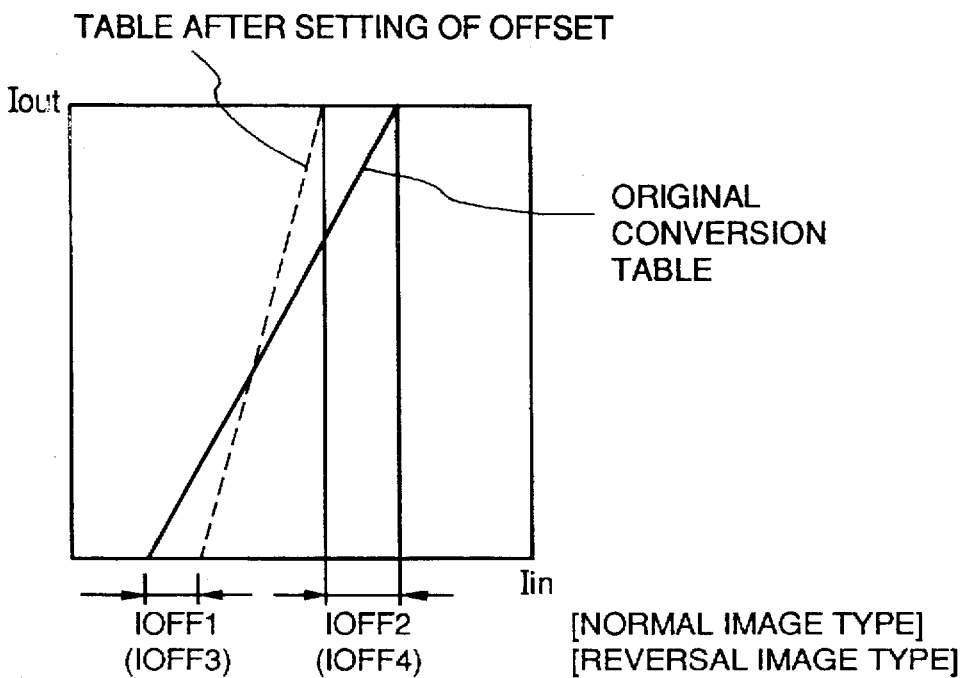
FIGS. 25A and 25B are graphs showing input/output characteristics obtained in consideration of an offset in conversion tables.
Figure 25B:
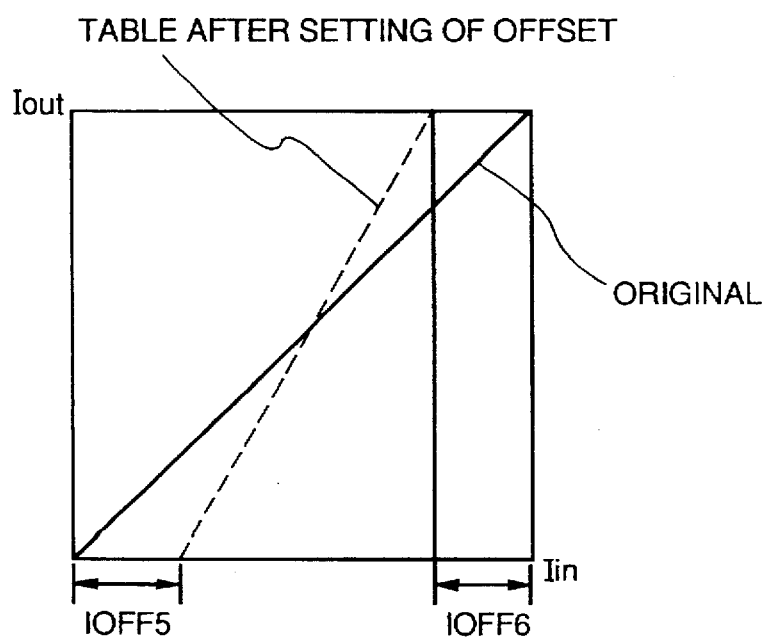

FIGS. 25A and 25B show input/output characteristics obtained when a conversion table is formed in consideration of an offset.

In FIGS. 25A and 25B, offsets IOFF1 to IOFF6 are set in correspondence with original types so as to obtain an optimal copy desired by a user. These offsets may be independently set from a scanning unit, or a corresponding copy result may be designated (e.g., setting for obtaining a darker or lighter copy).

In each of the above embodiments, HLIM (a reference frequency for discriminating the gradation image type) and IWLIM (an information width for discriminating the gradation image type) are used as references for discriminating the original type. However, the present invention is not limited to these. For example, the differences between the frequencies of all signal levels of a histogram or the ratio of a total frequency of a specific signal level may be used for discrimination.

Other feature points of a histogram may be used. For example, a maximum frequency level in a character portion, a level at a position where a difference in frequency checked from the maximum frequency level is smaller than a reference value, a level at a position where an accumulated frequency from the darkest or lightest level exceeds a reference value may be used.

Of peaks in a dark portion, peak as the darkest level is detected, and when the reversal image type is determined, the value of black may be set to be peak.

In the above embodiment, a histogram is formed using luminance signals (0=dark, 255=light), but may be formed using density signals (obtained by inverting luminance signals).

In this case, the right- and left-hand sides of the histograms shown in FIGS. 12, 13, and 14 are reversed.

The histogram forming unit 38 is arranged before variable magnification processing, but may be arranged after variable magnification processing or after an MTF correction circuit in the image processing unit.

A conversion table is arranged at the final position in the image processing unit, but may be arranged before or after the variable magnification unit 34. That is, the position of the conversion table is not particularly limited. The conversion table is calculated every time an original is exchanged. However, some conversion tables may be calculated, and an optimal one may be selected according to feature points of a histogram.

In each of the above embodiments, a histogram is formed in one color regardless of the original color, but may be formed in correspondence with each original color.

In this case, for example, two histograms are formed in correspondence with original colors (e.g., red and an achromatic color (black, white)), and different conversion tables may be calculated in correspondence with these original colors. This processing allows optimal density conversion for an original, and can eliminate the adverse affect of color sensitive characteristics of a reading system.

A histogram may be formed based on a signal obtained by mixing R, G, and B signals at an arbitrary ratio.

Furthermore, when the level rpeak for recognizing a non-information portion of a light portion is determined, a user may select a peak to be recognized as a non-information portion.

Also, the values of MLIM, ILIM, IWLIM, PWIDTH, WAREA, and LIGHT may be set by a user.

When a conversion table of the normal image type is formed, if the difference between black and white is smaller than the contrast width, black=0 is set. Alternatively, the noise level may be lowered between 0 and white—CONTLIM so as to correct black. In this case, a level having a largest frequency of levels having frequencies exceeding a new noise level may be set as black, or a darkest level may be set as black. If an optimal level cannot be found, the noise level may be further lowered, or a proper offset value, e.g., ILIM—LIGHT—CONTLIM may be set as black. In this manner, an original having a very low density can be reproduced without overemphasizing contrast.

Since a photograph original often include a very dark reading level, if data having a certain frequency or more are found between levels 0 and 4, a gradation image original may be determined.

Note that the present invention may be applied to a system constituted by a plurality of devices, or may be applied to an apparatus consisting of a single device. Also, the present invention may also be applied to a case wherein the invention is achieved by supplying a program to a system or an apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   first forming means for forming a histogram on the basis of input electrical signals;
   detection means for detecting predetermined feature points from the formed histogram;
   discrimination means for discriminating an image type of an original represented by the input electrical signals according to the detected predetermined feature points;
   second forming means for forming a table for converting signal levels of the electrical signals according to the detected predetermined feature points based on the image type of the original discriminated by said discrimination means; and
   selecting means for selecting, from the feature points detected by said detection means, at least one suitable feature point for forming the table in accordance with the image type discriminated by said discrimination means.

2. The apparatus according to claim 1, wherein the table formed by said second forming means is a conversion table including conversion of the electrical signals according to the image type of the original, luminance-density conversion and gradation correction.

3. The apparatus according to claim 1, wherein the predetermined feature points include lightest and darkest levels of the levels of the electrical signals, a maximum frequency of frequencies constituting the histogram, and a level of an electrical signal corresponding to the maximum frequency.

4. An image processing apparatus, which has a first mode for processing electrical signals by a prescan operation and a second mode for processing electrical signals by a main scan operation, comprising:
   first forming means for forming a histogram on the basis of electrical signals obtained by the prescan operation;
   detection means for detecting predetermined feature points from the formed histogram;
   discrimination means for discriminating an image type of an original represented by the input electrical signals according to the detected predetermined feature points;
   second forming means for forming a table for converting signal levels of the electrical signals according to the detected predetermined feature points based on the image type of the original discriminated by said discrimination means;
   generation means for generating reproduction signals on the basis of electrical signals obtained by the main scan operation in accordance with the table formed by said second forming means; and
   selecting means for selecting, from the feature points detected by said detection means, at least one suitable feature point for forming the table in accordance with the image type discriminated by said discrimination means.

5. The apparatus according to claim 4, wherein the table formed by said second forming means is a conversion table including conversion of the electrical signals according to the image type of the original, luminance density conversion and gradation correction.

6. The apparatus according to claim 4, wherein the predetermined feature points include lightest and darkest levels of the levels of the electrical signals, a maximum frequency of frequencies constituting the histogram, and a level of an electrical signal corresponding to the maximum frequency.

7. An image processing apparatus, which has a first mode for processing electrical signals by a prescan operation and a second mode for processing electrical signals by a main scan operation, comprising:
   first forming means for forming a histogram on the basis of electrical signals obtained by the prescan operation;
   detection means for detecting predetermined feature points from the formed histogram;
   discrimination means for discriminating an image type of an original represented by the electrical signals according to the detected predetermined feature points;
   second forming means for forming a first table for converting luminance signals of the electrical signals according to the discriminated type of original;
   third forming means for forming a second table for performing luminance-density conversion of the electrical signals;
   generation means for generating reproduction signals from the electrical signals obtained by the main scan operation according to the formed first and second tables; and
   selecting means for selecting, from the feature points detected by said detection means, at least one suitable feature point for forming the first table in accordance with the image type discriminated by said discrimination means.

8. The apparatus according to claim 7, wherein the predetermined feature points include lightest and darkest levels of the levels of the electrical signals, a maximum frequency of frequencies constituting the histogram, a level of an electrical signal corresponding to the maximum frequency, a total number of peaks, levels recognized as peaks, and a continuous amount of frequencies of a period having a largest level width of periods where frequencies exceeding a predetermined value continuously appear.

9. The apparatus according to claim 7, wherein said image processing apparatus is connected to a printing apparatus, and the second table further has a table for performing gradation correction of said printing apparatus.

10. An image processing method comprising the steps of:
    forming a histogram on the basis of input electrical signals;
    detecting predetermined feature points from the formed histogram;
    discriminating an image type of an original represented by the input electrical signals according to the detected predetermined feature points; and forming a table for converting signal levels of the electrical signals according to the detected predetermined feature points based on the discriminated image type of the original; and selecting, from the detected feature points, at least one suitable feature point for forming the table in accordance with the discriminated image type.

11. An image processing method, which has a first mode for processing electrical signals by a prescan operation and a second mode for processing electrical signals by a main scan operation, comprising the steps of:

forming a histogram on the basis of electrical signals obtained by the prescan operation;

detecting predetermined feature points from the formed histogram;

discriminating an image type of an original represented by the electrical signals according to the detected predetermined feature points;

forming a table for converting signal levels of the electrical signals according to the detected predetermined feature points based on the discriminated image type of the original;

generating reproduction signals on the basis of electrical signals obtained by the main scan operation in accordance with the formed table; and selecting, from the detected feature points, at least one suitable feature point for forming the table in accordance with the discriminated image type.

12. An image processing method, which has a first mode for processing electrical signals by a prescan operation and a second mode for processing electrical signals by a main scan operation, comprising the steps of:

forming a histogram on the basis of electrical signals obtained by the prescan operation;

detecting predetermined feature points from the formed histogram;

discriminating an image type of an original represented by the electrical signals according to the detected predetermined feature points;

forming a first table for converting luminance signals of the electrical signals according to the discriminated type of original;

forming a second table for performing luminance-density conversion of the electrical signals;

generating reproduction signals from the electrical signals obtained by the main scan operation according to the formed first and second tables; and selecting, from the detected feature points, at least one suitable feature point for forming the first table in accordance with the discriminated image type.

13. An image processing apparatus comprising:

first forming means for forming a destiny histogram on the basis of input electrical signals;

first detection means for detecting predetermined feature points from the formed histogram;

discrimination means for discriminating an image type of an original represented by the input electrical signals according to the detected predetermined feature points;

second detection means for detecting an effective range of the density of the input electrical signals according to the detected predetermined feature points;

second forming means for forming a table for converting signal levels of the electrical signals according to the detected predetermined feature points and the effective range of the density based on the image type of the original discriminated by said discrimination means; and selecting means for selecting, from the feature points detected by said first detection means, at least one suitable feature point for forming the table in accordance with the image type discriminated by said discrimination means.

14. The image processing apparatus according to claim 13, wherein said second forming means forms the table so that a converting curve of the table is substantially linear in the effective range, as an input range, detected by said second detection means.

15. The image processing apparatus according to claim 13, wherein said second detection means detects the entire input range of the density of the input electrical signals as an effective range if said discrimination means discriminates that the image type of the original is a gradation image type.

16. An image processing method comprising the steps of:

forming a density histogram on the basis of input electrical signals;

detecting predetermined feature points from the formed density histogram;

discriminating an image type of an original represented by the input electrical signals according to the detected predetermined feature points;

detecting an effective range of the density of the input electrical signals according to the detected feature points;

forming a table for converting signal levels of the electrical signals according to the detected predetermined feature points and the effective range of the density on the basis of the discriminated image type of the original; and selecting, from the detected feature points, at least one suitable feature point for forming the table in accordance with the discriminated image type.

17. The image processing method according to claim 16, wherein said table is formed so that a converting curve of said table is substantially linear in the detected effective range as an input range of the density of the input electrical signals.

18. The image processing method according to claim 16, wherein the entire input range is detected as an effective range if the image type of the original is discriminated as a gradation image type.

* * * * *

UNITED STATES PATENT AND TRADEMARK OFFICE
CERTIFICATE OF CORRECTION

PATENT NO.  : 5,748,773

DATED       : May 5, 1998

INVENTORS   : HIROHIKO TASHIRO ET AL.

It is certified that error appears in the above-identified patent and that said Letters Patent is hereby corrected as shown below:

COLUMN 2 line 24,   "of" should be deleted;
   line 53,   "of" should be deleted;
   line 64,   "of" should be deleted.

COLUMN 6 line 17,   "10" should be deleted.

COLUMN 7 line 42,   "1 0" should be deleted;
   line 46,   "&" should read --and--.

COLUMN 14 line 40,   "corresponds to type" should read --gradation image type--.

UNITED STATES PATENT AND TRADEMARK OFFICE
CERTIFICATE OF CORRECTION

PATENT NO. : 5,748,773

DATED : May 5, 1998

INVENTORS : HIROHIKO TASHIRO ET AL.

It is certified that error appears in the above-identified patent and that said Letters Patent is hereby corrected as shown below:

Column 18 line 52, "affect" should read --effect--.

COLUMN 19 line 7, "include" should read --includes--.

Signed and Sealed this

Tenth Day of November 1998

Attest:

BRUCE LEHMAN

Attesting Officer

Commissioner of Patents and Trademarks